(12) United States Patent
Gau

(10) Patent No.: US 12,393,181 B2
(45) Date of Patent: Aug. 19, 2025

(54) INTER-PLANT COMMUNICATION

(71) Applicant: BASF SE, Ludwigshafen AM Rhein (DE)

(72) Inventor: Sebastian Gau, Ludwigshafen Am Rhein (DE)

(73) Assignee: BASF SE, Ludwigshafen am Rhein (DE)

(*) Notice: Subject to any disclaimer, the term of this patent is extended or adjusted under 35 U.S.C. 154(b) by 0 days.

(21) Appl. No.: 18/021,683

(22) PCT Filed: Aug. 19, 2021

(86) PCT No.: PCT/EP2021/073083
§ 371 (c)(1),
(2) Date: Feb. 16, 2023

(87) PCT Pub. No.: WO2022/038243
PCT Pub. Date: Feb. 24, 2022

(65) Prior Publication Data
US 2024/0028017 A1   Jan. 25, 2024

(30) Foreign Application Priority Data

Aug. 21, 2020   (EP) .................................... 20192174

(51) Int. Cl.
*H04L 12/24* (2006.01)
*G05B 19/418* (2006.01)
(Continued)

(52) U.S. Cl.
CPC . *G05B 19/41885* (2013.01); *G05B 19/41855* (2013.01); *H04L 67/12* (2013.01)

(58) Field of Classification Search
CPC ........ G05B 19/41885; G05B 19/41855; H04L 67/12
(Continued)

(56) References Cited

U.S. PATENT DOCUMENTS

2011/0310770 A1* 12/2011 Liang .................... H04W 84/18
370/254
2014/0104738 A1* 4/2014 Schweitzer, III ........ H02H 3/08
361/87
(Continued)

OTHER PUBLICATIONS

"5G", Wikipedia, 29 pages, Last edited on Feb. 24, 2021. (URL: https://en.wikipedia.org/wiki/5G).
(Continued)

*Primary Examiner* — Moustafa M Meky
*Assistant Examiner* — Elizabeth Kassa
(74) *Attorney, Agent, or Firm* — Lowenstein Sandler LLP

(57) ABSTRACT

A method for interplant communication between a plurality of industrial plants is disclosed. The method comprises:
i. receiving, at at least one distribution unit, plant related data from at least one industrial plant of the plurality of industrial plants; and
ii. transmitting, via the at least one distribution unit, broadcast data to the plurality of industrial plants specifically to each industrial plant of the plurality of industrial plants, wherein the broadcast data comprises at least a part of the plant related data;
wherein the reception of the plant related data and the transmission of the broadcast data are done via at least one network. Further, a distribution unit for interplant communication between a plurality of industrial plants, a plant communication system for enabling interplant communication between a plurality of industrial plants, a computer program, a computer program product and a computer-readable storage medium is disclosed.

16 Claims, 4 Drawing Sheets

(51) Int. Cl.
H04L 41/0803 (2022.01)
H04L 67/12 (2022.01)

(58) Field of Classification Search
USPC .......................................................... 709/224
See application file for complete search history.

(56) References Cited

U.S. PATENT DOCUMENTS

| | | | |
|---|---|---|---|
| 2014/0130056 A1* | 5/2014 | Goodman | G06F 9/5044 |
| | | | 718/104 |
| 2016/0182285 A1* | 6/2016 | Ferguson | H04L 67/12 |
| | | | 709/228 |
| 2016/0182693 A1* | 6/2016 | Ferguson | H04L 12/1868 |
| | | | 709/217 |
| 2018/0060058 A1 | 3/2018 | Collins et al. | |
| 2018/0088541 A1* | 3/2018 | Sangi | G05B 13/021 |
| 2018/0314215 A9* | 11/2018 | Sangi | G05B 19/05 |
| 2020/0004229 A1 | 1/2020 | Hosoya et al. | |
| 2020/0225643 A1* | 7/2020 | Tugbo | G05B 19/4155 |
| 2020/0228316 A1* | 7/2020 | Cahill | H04L 9/3297 |
| 2020/0228342 A1* | 7/2020 | Nixon | G06F 21/64 |
| 2020/0278666 A1* | 9/2020 | Alam | G05B 19/41885 |
| 2022/0147672 A1* | 5/2022 | Nistala | G06Q 50/04 |
| 2022/0221832 A1* | 7/2022 | Chathuruthy | G06Q 10/06 |

OTHER PUBLICATIONS

European Search Report for EP Patent Application No. 20192174.9, Issued on Mar. 1, 2021, 3 pages.
International Search Report and Written Opinion for PCT/EP2021/073083 mailed Nov. 11, 2021, 10 pages.
Karrenbauer Michael et al: "Future industrial networking: from use cases to wireless technologies to a flexible system architecture", AUTOMATISIERUNGSTECHNIK—AT., vol. 67, No. 7, Jul. 26, 2019 (Jul. 26, 2019), pp. 526-544, XP055777242, ISSN: 0178-2312, DOI: 10.1515/auto-2018-0141, URL:http://publications.rwth-aachen.de/record/764737/files/764737.pdf.

* cited by examiner

INTER-PLANT COMMUNICATION

CROSS REFERENCE TO RELATED APPLICATION(S)

The present application is a national stage entry under 35 U.S.C. § 371 of International Application No. PCT/EP2021/073083, filed on Aug. 19, 2021, which claims priority to European Patent Application No. 20192174.9, filed on Aug. 21, 2020, the entirety of which are incorporated herein by reference in their entirety.

TECHNICAL FIELD

The present teachings relate to a method for interplant communication between a plurality of industrial plants. The present teachings further relate to a distribution unit and a plant communication system for enabling interplant communication between a plurality of industrial plants and to a computer program, a computer program product and a computer-readable storage medium. The method and devices specifically may be used in the field of industry, such as in the field of manufacturing industry and/or service industry, in order to for example enable exchange of process parameter between a plurality of industrial plants, specifically between a plurality of industrial plants which at least partially commonly depend on at least one resource and/or which at least partially commonly contribute to supplying at least one resource. Other fields of application of the present application, however, are also feasible.

BACKGROUND ART

In the field of industry, such as in the field of manufacturing industry and/or service industry, in many cases, multiple industrial plants form an industrial compound or a combined industrial location. Sometimes such a plurality of industrial plants is referred to as a Verbund site, e.g. a compound of physically and/or chemically closely coupled plants. At least some of the plants within the plurality may be sharing one or more supply chains, educts and/or products. Generally, exchanging information between the plants and between the operators of the plants forming the compound may be of significant importance to keep production efficiency as high as possible. Typically, each of such plants may have a dedicated control system which is isolated from the other plants. Such an isolation may be in place, for example, due to security requirements, such as cybersecurity requirements. Usually, technologies established decades ago are used for exchanging information, such as fax or phone communication. For example, operators of the industrial plants may directly communicate via phone calls and/or fax with the other plant operators to align on the Verbund site operations. Thus, the exchange of information between such a plurality of plants, or the multiple plants of the Verbund site, may be slow and communicating information in a reliable manner may be complicated and time consuming.

It is therefore desirable to provide devices and method for interplant communication between a plurality of industrial plants which at least partially address the above-mentioned challenges. Specifically, it is desirable to provide devices and method which can allow fast, efficient and cost-effective communication between a plurality of industrial plants.

SUMMARY

At least some of the problems inherent to the known art will be shown solved by the features of the independent claims.

When viewed from a perspective, a solution to establish inter-plant communication within a plurality of industrial plants may be by directly connecting each of the plants within the plurality of plants to the other plants in the plurality via hard wiring. The hard wiring can for example comprise one or more electrical and/or optical fiber cables for transporting signals of interest from one plant to the other plants. There may be even be explored different options for the communication to be established on the control system level by hard wiring.

Such a realization with fully interconnected plant setup can enable either one or more of: supervision, control and inter-plant control functions. The realization may also result in a high availability of the communication channels by ensuring a dedicated channel between each plant to the other. If communication between a first plant and a second plant breaks down, it may not affect the communication between the other plants, or even between the first plant and the rest of the plants except the second plant. Similarly, the communication between the second plant and the rest of the plants except the first plant may be preserved. In this way, a high availability of the communication channels may be achieved.

An industrial plant typically comprises a plurality of sensors and at least one control system for controlling at least one parameter related to the process in the plant. The control function is usually performed by the controller in response to at least one measurement signal from at least one of the sensors. The controller or control system of the plant may be implemented as a distributed control system ("DCS").

Despite the advantages achieved by such a fully interconnected setup, several practical challenges may remain. Specifically, the installation of hard wiring between the industrial plants can be expensive. Moreover, in established plants free real estate may be scarce and/or not available at the right location, so it may not be possible to find space for laying the hard wiring cables between the plants for establishing communication. Thus, many business cases for implementing an inter-plant communication may become uneconomic or impractical as a consequence of such a structural extension of the site's infrastructure. Moreover, if the site has to be expanded by building one or more additional plants within the plurality, it may be required that new hardwiring between the new plant and each of the previous plants in the plurality also be implemented. Hence, despite having high availability, the fully interconnected plant solution may not be a flexible or scalable one.

The applicant has realized that at least some of the problems may also be addressed by a method and a distribution unit for interplant communication between a plurality of industrial plants, by a plant communication system for enabling interplant communication between a plurality of industrial plants and by a computer program, a computer program product and a computer-readable storage medium. Advantageous embodiments which might be realized in an isolated fashion or in any arbitrary combinations are listed in the dependent claims as well as throughout the specification.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present teachings may, as the skilled person will recognize, be performed by using alternative features. Similarly, features introduced by "in an embodiment" or similar expressions are intended to be optional features, without any restriction regarding alternative embodiments of the present teachings, without any restrictions regarding the scope of the present teachings and without any restriction regarding the possibility of combining the features introduced in such way with other optional or non-optional features of the present teachings.

When viewed from a first perspective, a method for interplant communication between a plurality of industrial plants is disclosed. The method comprises the following steps which, as an example, may be performed in the given order. It shall be noted, however, that, under specific circumstances, a different order may also be possible. Further, it is also possible to perform one or more of the method steps once or repeatedly. Further, it is possible to perform two or more of the method steps simultaneously or in a timely overlapping fashion, specifically when some or more of the method steps are performed repeatedly. The method may comprise further method steps which are not listed.

The method comprises:
  i. receiving, at at least one distribution unit, plant related data from at least one industrial plant of the plurality of industrial plants; and
  ii. transmitting, via the at least one distribution unit, broadcast data to the plurality of industrial plants specifically to each industrial plant of the plurality of industrial plants, wherein the broadcast data comprises at least a part of the plant related data;
  wherein the reception of the plant related data and the transmission of the broadcast data is done via at least one network.

Or in a more general sense, the method comprises:
  i. providing, at at least one distribution unit, plant related data from at least one industrial plant of the plurality of industrial plants; and
  ii. providing, via the at least one distribution unit, broadcast data to the plurality of industrial plants specifically to each industrial plant of the plurality of industrial plants, wherein the broadcast data comprises at least a part of the plant related data;
  wherein the plant related data and the transmission of the broadcast data are provided via at least one network.

The term "industrial plant" as used herein is a broad term and is to be given its ordinary and customary meaning to a person of ordinary skill in the art and is not to be limited to a special or customized meaning. The term specifically may refer, without limitation, to any technical infrastructure that is used for an industrial purpose. The industrial purpose may be manufacturing or processing of one or more industrial products, i.e., a manufacturing process or a processing performed by the industrial plant. The industrial product can, for example, be any physical product, such as a chemical, a biological, a pharmaceutical, a food, a beverage, a textile, a metal, a plastic, a semiconductor. Additionally, or alternatively, the industrial product can even be a service product such as electricity, heating, air-conditioning, waste treatment such as recycling, chemical treatment such as breakdown or dissolution, or even incineration, etc. Accordingly, the industrial plant may be one or more of a chemical plant, a process plant, a pharmaceutical plant, a fossil fuel processing facility such as an oil and/or a natural gas well, a refinery, a petrochemical plant, a cracking plant, and the like. The industrial plant can even be any of a distillery, an incinerator, or a power plant. The industrial plant can even be a combination of any of the examples given above provided the combination shares a control system or is controlled via the same supervisory control system, e.g., supervisory control and data acquisition ("SCADA") system. For applying the present teachings, in some cases a sub-facility within a large plant may even be considered an industrial plant as long as the sub-facility comprises a dedicated control system. The dedicated control system is preferably a DCS. In some cases though, for example in case of smaller plants, the dedicated control system may be implemented using programmable logic controllers ("PLCs").

The advantages of the present teachings can be further appreciated when the plant, facility or sub-facility is isolated, in terms of sensor and/or control signals, from at least one of the other sub-facilities and/or plants within the large plant. It will be appreciated that by isolated in terms of sensor and/or control signals, it is here meant that at least some of the sensor and/or control signals of the plant, facility or sub-facility are not available at the other sub-facilities and/or plants within the large plant or the plurality of plants. Especially in cases where at least some of the sensor and/or control signals are of interest to one or more of the other sub-facilities and/or plants, the present teachings can provide a way to reliably transmit such signals to the other sub-facilities and/or plants. The infrastructure may comprise equipment or process units such as any one or more of a heat exchanger, a column such as a fractionating column, a furnace, a reaction chamber, a cracking unit, a storage tank, a precipitator, a pipeline, a stack, a filter, a valve, an actuator, a transformer, a circuit breaker, a machinery e.g., a heavy duty rotating equipment such as a turbine, a generator, a pulverizer, a compressor, a fan, a pump, a motor, etc. Thus, industrial plant in the context of present teachings is a facility, sub-facility or infrastructure that comprises a dedicated control system, for example, a DCS system.

At least some of the equipment or process units of the industrial plant may be monitored and/or controlled for producing the one or more industrial products. The monitoring and/or controlling may even be done for optimizing the production of the one or more products. The equipment or process units may be monitored and/or controlled via a controller, such as DCS, in response to one or more signals from one or more sensors. In addition, the plant may even comprise at least one programmable logic controller ("PLC") for controlling some of the processes. The industrial plant may typically comprise a plurality of sensors which may be distributed in the industrial plant for monitoring and/or controlling purposes. Such sensors may generate a large amount of data. As such, production, such as chemical and/or service production, can be a data heavy environment. Accordingly, each industrial plant may produce a large amount of process related data.

Those skilled in the art will appreciate that the industrial plant usually may comprise instrumentation that can include different types of sensors. Sensors may be used for measuring various process parameters and/or for measuring parameter related to the equipment or the process units. For example, sensors may be used for measuring a process parameter such as a flowrate within a pipeline, a level inside a tank, a temperature of a furnace, a chemical composition of a gas, etc., and some sensors can be used for measuring vibration of a turbine, a speed of a fan, an opening of a valve, a corrosion of a pipeline, a voltage across a transformer, etc. The difference between these sensors cannot only be based on the parameter that they sense, but it may even be the sensing principle that the respective sensor uses. Some examples of sensors based on the parameter that they sense may comprise: temperature sensors, pressure sensors, radiation sensors such as light sensors, flow sensors, vibration sensors, displacement sensors and chemical sensors, such as those for detecting a specific matter such as a gas. Examples of sensors that differ in terms of the sensing principle that they employ may for example be: piezoelectric sensors, piezoresistive sensors, thermocouples, impedance sensors such as capacitive sensors and resistive sensors, and so forth.

As outlined, the at least one industrial plant may be part of a plurality of industrial plants. The term "plurality of industrial plants" as used herein is a broad term and is to be given its ordinary and customary meaning to a person of ordinary skill in the art and is not to be limited to a special or customized meaning. The term specifically may refer, without limitation, to a compound of at least two industrial plants having at least one common industrial purpose. Specifically, the plurality of industrial plants may comprise at least two, at least five, at least ten or even more industrial plants being physically and/or chemically coupled. The plurality of industrial plants may be coupled such that the industrial plants forming the plurality of industrial plants may share one or more of their value chains, educts and/or products. The plurality of industrial plants may also be referred to as a compound, a compound site, a Verbund or a Verbund site. Further, the value chain production of the plurality of industrial plants via various intermediate products to an end product may be decentralized in various locations, such as in various industrial plants, or integrated in the Verbund site or a chemical park. Such Verbund sites or chemical parks may be or may comprise one or more industrial plants, where products manufactured in the at least one industrial plant can serve as a feedstock for another industrial plant.

The present teachings can enable interplant communication between the plurality of industrial plants. The term "interplant communication" as used herein is a broad term and is to be given its ordinary and customary meaning to a person of ordinary skill in the art and is not to be limited to a special or customized meaning. The term specifically may refer, without limitation, to a unidirectional or bidirectional exchange of at least one of information, data or commands between at least two industrial plants by means of at least one of wire, radio, optical or other electromagnetic systems. Specifically, the term may refer to a unidirectional or bidirectional exchange of information by means of wire transmission. The information exchange between at least two industrial plants via the distribution unit is preferably bidirectional. In some cases, it may be even unidirectional for example, if one of the plants is not active or is under shutdown. Additionally, the communication may even be sent in a unidirectional manner to other facilities, such as a central control room, where it may be beneficial to receive plant related data from at least some of the plants. The at least two industrial plants may be part of the plurality of industrial plants, specifically of the one or more Verbund sites of industrial plants. For example, the interplant communication may exchange information referring to one or more process parameters which are indicators of the production process of the industrial product to be manufactured.

As outlined above, the method comprises providing, at at least one distribution unit, plant related data from the at least one industrial plants of the plurality of industrial plants. The plant related data may be provided at the at least one distribution unit via transmitting said data from at least one industrial plants. Accordingly, the plant related data may be received at the at least one distribution unit. The term "plant related data" as used herein is a broad term and is to be given its ordinary and customary meaning to a person of ordinary skill in the art and is not to be limited to a special or customized meaning. The term specifically may refer, without limitation, to one or more items of information related to or originating from the industrial plant as defined above. Specifically, the plant related data may comprise at least one of a signal of interest such as any one or more of: manufacturing parameter, sensor output signal, and/or at least one parameter indicating quality of the signal and/or its source, controller setpoint signal and/or output signal, a processing parameter of processing one or more industrial products, a service product parameter or the like. The plant related data in this context may comprise time-series signals, preferably real-time signals, and/or a signal with a specific time stamp and/or range and/or at least one parameter indicating quality of the signal and/or its data source. The plant related data may specifically comprise plant-specific signals, for example plant-specific time-series signals from an industrial plant that are of interest to at least one of the other industrial plants in the plurality of industrial plants. More specifically, the plant related data may comprise signal of interest based on which the operation of at least one of the other industrial plants may be dependent or affected. Further, the plant related data may even be pre-filtered either at the receiving plant and/or via the distribution node. This may be done to display those one or more signals of interest at a receiving industrial plant which are relevant for the receiving industrial plant.

The plant related data may comprise one or more process parameters monitored by the at least one sensor monitoring and/or controlling the equipment and/or the process units of the industrial plant. Thus, the plant related data may be a specific process parameter of the equipment and/or the process units of the at least one industrial plant. it will thus be appreciated that the plant related data may also comprise a plurality of process parameters from the plurality of sensors of the industrial plant. As also outlined, the plant related data may further comprise at least one timestamp, wherein the timestamp may record a point in time at which the one or more process parameter are obtained. The plant related data may even comprise information or data specifying a time period, for example using two timestamps to delimit the specified time period. The time period may even be specified using a single timestamp and a duration value in either direction. In any case, there may be further timestamps within the time period.

The term "distribution unit" as used herein is a broad term and is to be given its ordinary and customary meaning to a person of ordinary skill in the art and is not to be limited to a special or customized meaning. The term specifically may refer, without limitation, to an arbitrary device or system, specifically electronic computing device or processor, which is configured, such as by hardware configuration and/or by software programming of the computing device, for one or more of receiving, transforming, processing and/or transmitting data. The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit ("ALU"), at least one floating-point unit ("FPU"), such as a math co-processor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit ("CPU"). Additionally, or alternatively, the processor may be or may comprise a microprocessor, thus specifically the processor's elements may be contained in one single integrated circuit ("IC") chip. Additionally, or alternatively, the processor may be or may comprise one or more application-specific integrated circuits ("ASICs") and/or one or more field-programmable gate arrays ("FPGAs") or the like. Specifically, the distribution unit may be configured, such as by hardware configuration and/or by software programming of the computing device, for receiving the plant related data, for processing the plant related data and further for transmitting the broadcast data. The distribution unit may be or may comprise one or more of a server, a processor, a computer or the like. Further, the distribution unit may comprise one or more of a receiving unit and/or a transmission unit, such as for wire-bound and/or wireless communication.

As further outlined above, the method comprises transmitting, via the at least one distribution unit, broadcast data to the plurality of industrial plants. Specifically, the transmission may take place by the distribution unit itself, such as automatically. As an example, the distribution unit may be configured to automatically transform the plant related data into the broadcast data, such as by combining the plant related data from one or more of the industrial plants and/or by adding additional data, as will be outlined in further detail below. It will be appreciated that the present teachings can allow the broadcast data to be transmitted in a cycle-less fashion or near real-time fashion. The cycle-less near real time transmission may refer to a broadcast process which is directly induced by a value change on the source interface. Cycle-less in this context means that a value change at the source interface serves as a trigger for the transmission of this value to all configured target interfaces, e.g., receiving plants. The signal transmission time of the plant related data via the broadcast data to the receiving plants can thus be close to the network latency. According to an aspect, an additional cycle-based logic can be used as a watchdog to verify that one or more of the receiving plants or target interfaces accepted or acknowledged the broadcast data. It can thus be ensured by watchdog, for example as a part of the distribution unit, that the broadcast data is reliably received by each of the plants.

The term "broadcast data" as used herein is a broad term and is to be given its ordinary and customary meaning to a person of ordinary skill in the art and is not to be limited to a special or customized meaning. The term specifically may refer, without limitation, to one or more transformed or processed items of information. Specifically, the broadcast data may comprise at least one item of information which was transformed and/or processed by the distribution unit and may further be transmitted via a network. Specifically, the broadcast data comprises at least a part of, or at least partially, the plant related data from one or more of the industrial plants, e.g. processed by the at least one distribution unit and further transmitted to the plurality of industrial plants via the at least one network. The processing at the distribution unit specifically may take place automatically, i.e. without user interaction. For example, the broadcast data may comprise at least a part of the plant related data that has been harmonized and/or contextualized by the at least one distribution unit. Further, the broadcast data may also comprise at least one of a time-stamp and/or an identifier. The broadcast data may specifically comprise a bundle of plant related data, more specifically a bundle of harmonized and/or contextualized plant related data from a plurality of plants, provided with the time stamp and the identifier. The bundle of plant related data comprised by the broadcast data may specifically comprise plant related data from each of the industrial plants of the plurality of industrial plants.

According to an aspect, the broadcast data may be fed into dashboard at each plant, for example, at a local backend system at each plant that serves as a source for the dashboard. This can harmonize the way in which the inter-plant data is displayed at each of the plants. Should a user from one plant be transferred at a different plant, the dashboard can result in reduction of human error.

As outlined above, the method comprises using at least one network for providing the plant related data and the transmission of the broadcast data. Thus, as an example, each of the industrial plants may comprise at least one transmitter, or at least one transmitting network interface, for transmitting plant related data to the distribution unit and may comprise at least one receiver, or at least one receiving network interface, for receiving the broadcast data from the distribution unit. In some cases, the at least one transmitter and the at least one receiver may be the same device, for example, a transceiver. Accordingly, the at least one transmitting network interface and the at least one receiving network interface may be the same device, for example a bidirectional network interface, more generally termed here a network interface. Thus, each of the industrial plants may comprise at least one network interface. Similarly, the distribution unit may comprise at least one receiver for receiving the plant related data from the at least one industrial plant and may comprise at least one transmitter for transmitting the broadcast data to the industrial plants. Similar to the above, similar realization of receiver-transmitter, i.e., unidirectional or bidirectional network interface, apply here as well. The term "network" as used herein is a broad term and is to be given its ordinary and customary meaning to a person of ordinary skill in the art and is not to be limited to a special or customized meaning. The term specifically may refer, without limitation, to an arbitrary interconnection between at least one communication endpoint and at least one distribution point. The interconnection of the network may be formed by means of physically hard wiring, optical and/or wireless radio-frequency methods. As outlined above, the network specifically may be or may comprise a physical network fully or partially made by hardwiring, such as a fiber-optical network or a network fully or partially made by electrically conductive cables or a combination thereof. The network specifically may be a star-like network, i.e. a network wherein the communication endpoints are connected to the distribution point located in the center of the network, specifically at all within the distribution unit. Other options, such as a bus network, a ring network, a mesh network, a fully connected network or a tree network, may also be feasible. Specifically, the at least one communication endpoint may be or may comprise at least one network interface of the at least one industrial plant of the plurality of industrial plants, as will be outlined in further detail below. The at least one distribution unit may be the at least one distribution point of the network, such as at the center of the star-shaped network. Thus, the network may interconnect the network interfaces of the industrial plants of the plurality of industrial plants with the at least one distribution unit. Consequently, the industrial plants of the plurality of industrial plants, specifically the network interfaces of the industrial plants, may be connected indirectly with each other via the at least one network.

As outlined above, the method enables interplant communication between the plurality of industrial plants. The industrial plants of the plurality of industrial plants may be interconnected in the at least one network via the at least one distribution unit. Thus, the industrial plants of the plurality of industrial plants may be connected indirectly in the at least one network via the at least one distribution unit. Specifically, the industrial plants of the plurality of industrial plants may be connected without any direct connection in between the industrial plants or such that at least two industrial plants exist within the plurality which are not directly connected. Thus, at least two of the industrial plants of the plurality of industrial plants may not be directly physically connected to each other. Thus, at least two of the industrial plants of the plurality of industrial plants may not be able to communicate directly with each other.

According to an aspect, each industrial plant comprises a control layer, the control layer of each of the plants being communicatively coupled to an operational layer, wherein the plant related data is provided at the at least one distribution unit via the operational layer, and wherein the broadcast data is provided to the plurality of industrial plants via the operational layer. The at least one network is preferably a part of the operational layer.

Thus, viewed from a more specific perspective, the present teachings can also provide a method for interplant communication between a plurality of industrial plants, wherein each industrial plant comprises a control layer, and wherein the control layer of each of the plants is communicatively coupled to an operational layer, wherein the method comprises:

providing, at at least one distribution unit, plant related data from at least one industrial plant of the plurality of industrial plants; wherein the plant related data is provided at the at least one distribution layer via the operational layer; and providing, via the at least one distribution unit, broadcast data to the plurality of industrial plants; wherein the broadcast data comprises at least a part of the plant related data, and wherein the broadcast data is provided to the plurality of industrial plants via the operational layer.

It will be understood that the broadcast data is provided to each industrial plant in the plurality of industrial plants.

In a further specific sense, there can also be provided a method for interplant communication between a plurality of industrial plants, wherein each industrial plant comprises a control layer, and wherein the control layer of each of the plants is communicatively coupled to an operational layer, wherein the method comprises:

receiving, at at least one distribution unit, plant related data from at least one industrial plant of the plurality of industrial plants; wherein the plant related data is received at the at least one distribution unit via the operational layer; and transmitting, via the at least one distribution unit, broadcast data to the plurality of industrial plants; wherein the broadcast data comprises at least a part of the plant related data, and wherein the broadcast data is received at the plurality of industrial plants via the operational layer.

It will be understood that the broadcast data is received at each industrial plant in the plurality of industrial plants.

Each industrial plant comprises a device layer and a control layer, which are associated with that plant. The device layer may comprise devices such as sensors, equipment and process units at least some of which are capable of generating data indicative of the physical processes within the plant. Such generated data may then be provided to the control layer, e.g., by transmitting to the control layer either at own initiative or in response to a request from the control layer. In cases where higher isolation between the layers is desired, the flow of data may be unidirectional, i.e., from device layer to the control layer at least for certain safety critical devices. The data may be provided either directly or indirectly to the control layer. The control layer comprises at least one control system for controlling and/or at least some of the physical processes of the plant in response to at least a part of the generated data. Thus, the control layer may comprise a core process system including one or more processing devices and storage devices. The control layer may include one or more distributed processing and storage devices forming a programable logic controller ("PLC") system or distributed control system ("DCS") with control loops distributed throughout the respective industrial plant to which the control layer belongs. The device layer and the control layer of the plant are hence communicatively coupled. The control layer is also communicatively coupled to an operational layer. The operational layer is usually a common processing layer for the plants within the plurality of plants. It will be appreciated that the device layer and the control layer of each plant are isolated from those of the other plants, hence these layers are plant specific. Accordingly, there is no direct inter-plant connection between these layers that belong to different industrial plants. Such isolation may exist for example due to the respective plants being stand-alone plants supplied by different suppliers and/or due to security requirements.

The operational layer is typically used for managing functions such as production and/or operation of one or more of the plants within the plurality or plants. Certain non-limiting representative examples of such functions are, configuring production sequence of products to be manufactured, production batch management, plant maintenance management, production planning, etc. The plant-specific control layer provides supervisory data to the operational layer, e.g., by transmitting to the operational layer either at own initiative or in response to a request from the operational layer. Furthermore, the supervisory data may be provided either directly or indirectly to the operational layer. The supervisory data may even comprise at least a part of the control data. The operational layer may even provide production data to the plant-specific control layer for controlling the operation and/or production of the respective plant. It will be appreciated that the control layer may provide control data to the device layer for achieving the desired operation and/or production of the plant. The control data may hence be used for controlling one or more equipment such as any one or more of: actuator, heater, switch, furnace, reactor, etc., for achieving the desired operation and/or production specified by the operational layer via production data provided to the control layer. The control data hence may be at least partially generated in response to at least a part of the production data. It will also be appreciated that the supervisory data may thus comprise at least a part of the generated data. The supervisory data may even comprise at least a part of the control data. The operational layer provides the plant related data at the at least one distribution limit. The plant related data comprises at least a part of the supervisory data from one or more of the plants within the plurality of plants. Accordingly, the plant related data may comprise at least a part of the generated data from one or more of the plants, such as one or more sensor output signals. The plant related data may even comprise at least a part of the control data of one or more of the plants, such as one or more set points and/or controller outputs. The plant related data may even comprise at least a part of the production data of one or more of the plants.

The processing layers discussed herein, namely, the device layer, the control layer and the operational layer may even be called Level 1 layer, Level 2 layer and Level 3 layer respectively, however in principle there may be one or more further processing layers on either side of these layers. The device layer, the control layer and the operational layer are usually configured in a secure network.

The secure network may be a segregated network including more than two security zones separated by firewalls. Such firewalls may be network or host-based virtual or physical firewalls.

The firewall may be hardware- or software-based to control incoming and outgoing network traffic. Here predetermined rules in the sense of a white listing may define allowed traffic via access management or other configuration settings. Depending on the firewall configuration the security zones may adhere to different security standards. The secure network may be physically located within the plurality of plants. In some cases, however, the secure network may even extend beyond the physical location of the plurality. For example, if any one or more or plant related databases, processing systems, or other computational services are implemented as one or more cloud-based services.

In a further aspect the device layer is configured in a first security zone via a first firewall and the control layer is configured in a second security zone via a second firewall. To securely protect the device layer, the first security level zone adheres to a higher security standard than the second security zone. Security zones or levels may adhere to a common industry standard such as lined out in Namur documentation IEC 62443. Similarly, the operational layer may be configured in a third security zone via a third firewall. The first and second security levels may adhere to a higher security standard than the third security level. Hence, the third and second security zones may be staggered in security standard as well. This can allow for higher security standards on the lower security zone of the control layer and lower security standards on higher security zones of the control layer.

By saying "a part of", in context of the present teachings it is meant such a part of the respective data such that the information about the source that said part intends to encapsulate is obtainable by the intended recipient processor of the part of data by reading it. Some non-limiting examples in this regard may be; while the whole of data consists of measurements from sensor A and sensor B, a provided portion of data comprising only measurement of sensor A may be referred to "a part of" the whole data. Similarly, data which is truncated in any other manner, such as by reduction in timescale and/or resolution or down-sampling, or via any other sensible data compression or subdivision means may also be called a part of data. Realistically, a portion of data which is corrupt, unreadable, or meaningless as a virtue of extracting it from the whole data may not be referred to as a part of the whole data in the context of present teachings.

As also previously discussed, each plant may comprise at least one network interface, which network interface is used for communication at the operational layer. One or more plants may provide their respective plant related data, or their part of the plant related data, to the distribution unit via their at least one network interface. The network interface may be any data access interface, for example an Open Platform Communications Data Access ("OPC DA") interface. In some cases, the network interface is used for archiving plant information into an information management system or a data repository or an archive specific to that industrial plant. An example of such an archive is Production Information Management System ("PIMS"). Thus, within the plurality of plants, according to an aspect, information from at least some of the plants may be archived in each of their plant specific repository. Hence, there is usually a unidirectional channel between the respective control layer of each plant and their respective repository. The unidirectional channel may be established via the at least one network interface of each plant. For preserving high security of the control layer, the archive may be logically placed in the operational layer. However, there is usually no communication link between a plant and the archives of other plants. It may be possible for some plants to have a shared PIMS.

By establishing a communication to the distribution unit via the at least one network interface the present teachings can provide a further synergistic effect that inter-plant communication is leveraged using the preexisting operational layer such that need for establishing new cabling is obviated. The security requirements can thus also be respected. The applicant has further realized that by using the operational layer for handling processing and network load required by such inter-plant communication, it can be prevented that highly sensitive operations on the control layer and/or the device layer are affected. Furthermore, the requirement for any change to either the device layer or control layer can be prevented. Plant reliability and/or safety can thus be maintained. This can further result in a more scalable and flexible system which can also make onboarding of a new industrial plant in the plurality simpler by requiring little to no change in the hardware configuration for the industrial plants that are already existing within the plurality.

Thus, the plant related data may be provided, from the at least one industrial plant, at the at least one distribution unit via at least one network interface. The at least one network interface of the respective plant may be the interface the plant to the operational layer. The network interface may be any suitable data access interface. As a non-limiting example, at least one of the interfaces may be an OPC DA interface.

Viewed from another more specific perspective, there can also be provided a method for interplant communication between a plurality of industrial plants, wherein each industrial plant comprises a control layer, and wherein the control layer of each of the plants is communicatively coupled to an operational layer, wherein the method comprises:
- receiving, at the operational layer, plant related data from at least one industrial plant of the plurality of industrial plants; wherein the plant related data comprises data provided by the control layer of each of at the least one industrial plant;
- receiving, at at least one distribution unit, the plant related data from the operational layer;
- transmitting, via the at least one distribution unit, broadcast data to the plurality of industrial plants; wherein the broadcast data comprises at least a part of the plant related data obtained from the operational layer;
- receiving, at the plurality of industrial plants, the broadcast data.

From the aforementioned, it will be understood that the receiving and transmitting of the various data, at the operational layer, the distribution unit, and the each of the plants may be done via the at least one network interface. The at least one network interface of the respective plant may be the interface the plant to the operational layer. The network interface may be any suitable data access interface.

Thus, from the aforementioned, according to an aspect, the at least one network may comprise at least partially, a production network or a Level 3 network. The Level 3 network is that which lies within the security zone of the operational layer. Specifically, the network, more specifically the Level 3 network, may be a network or Level 3 network according to the ANSI/ISA-95 standard.

The Level 3 network specifically may comprise at least one server, or a Level 3 Server, wherein the Level 3 server may refer to a server with a network interface linked to the production network.

According to another aspect for any of the perspectives, the broadcast data is provided to the control layer of each of the plants. The broadcast data may be provided via the same network interface, or via a different network interface. Thus, relevant plant data can be provided at each plant while obviating the need for interplant cabling. A control layer to control layer transfer, or more specifically, DCS-to-DCS transfer, can thus be realized by leveraging the pre-existing operational layer. Another advantage can be that the broadcast data is transmitted to each plant in an essentially parallel fashion, thus the broadcast data can be provided without any undue delay at each plant. This can have advantages can compared to a more sequential or serial communication of data to each plant. Relevant events or occurrences can thus be better coordinated and tracked amongst the plants which plants may otherwise be essentially isolated from each another due to individual and separated control layers. A reliable communication between the plants can thus be established with reduced costs.

As discussed previously, the plurality of plants, Verbund site and/or the plant communication system as explained in further detail below specifically may comprise at least one Plant Information Management System ("PIMS"). More specifically, the PIMS may comprise at least one archive, also referred to as the PIMS archive, such as an archive having one or more databases and/or having one or more data storage devices, into which data such as process data of the Verbund site or of at least a part thereof may be stored for archive purposes. The production network may be an established network and may be used e.g. for connecting other components of the Verbund site such as control systems of the industrial plants to the PIMS archive. This production network may be separated from an intranet of the plurality or Verbund site, such as the Level 4, or L4, network, by one or more firewalls. The intranet may be used to access the PIMS and/or the PIMS archive of any of the plants. Although, the control layer and/or the device layer may not be accessible via the intranet. The intranet may be a site-wide network for the plurality of plants and related facilities such as offices. The intranet is usually isolated from public network, e.g., internet, via one or more firewalls.

As also discussed, each industrial plant of the plurality of industrial plants may be connected with the at least one distribution unit via at least one network interface. Specifically, each of the industrial plants, and also optionally the distribution unit, each may comprise the at least one network interface. The at least one network interface may take over and/or support the tasks of the above-mentioned transmitters and/or receivers, respectively. Thus, the network interface of each industrial plant of the plurality of industrial plants may be connected to the network interface of the distribution unit. For example, the network interface may comprise at least one OPC standard interface, i.e. an interface in accordance with the OPC Unified Architecture ("OPC UA") standard, providing a machine to machine communication protocol for industrial automation developed by the OPC Foundation. Specifically, the network interface of each industrial plant, further optionally one or more of the distribution unit, the decision logic or the Web server, as explained in further detail below, may comprise at least one OPC interface according to the standard IEC 62541, specifically at least one OPC DA interface, such as according to the OPC Data Access Specification of the OPC Classic Specifications. Additionally or alternatively, the network interface may comprise a DCS interface which may be or may comprise a server connected to the DCS network which exposes or receives configured data from or to the control system via OPC DA. OPC DA may refer to a COM-based industry standard for exposing real-time time series data from various sources in a data source specific namespace structure.

As previously discussed, the Level 3 network may comprise at least one Level 3 Server.

As outlined above, the at least one distribution unit may be configured, such as by hardware configurations and/or by software programming of the computing device, for processing the plant related data and thereby obtaining the broadcast data. Specifically, the distribution unit may be configured for processing the plant related data in an on the fly manner. As used herein, without limitation, the term "on the fly" specifically may refer to a situation where at least two computing processes are performed simultaneously without intentionally pausing, freezing or delaying one of the computing processes. Specifically, the processing of the plant related data at the distribution unit may be performed simultaneously to other computing processes of the distribution unit. For example, the processing of the plant related data may be performed simultaneously with the reception and transmission of the broadcast data. Thus, the reception of plant related data, the processing of plant related data and the transmission of the broadcast data may be performed at least partially in a timely overlapping fashion.

The processing of plant related data may comprise harmonizing the plant related data, specifically by harmonizing a nomenclature and/or identifiers of the plant related data. The term "harmonizing" as used herein is a broad term and is to be given its ordinary and customary meaning to a person of ordinary skill in the art and is not to be limited to a special or customized meaning. The term specifically may refer, without limitation, to the process of modifying data according to at least one common standard or according to at least one agreement, such that the data may be one or more of read, processed or understood by two or more parties.

Further, additionally or alternatively, the processing of the plant related data may also comprise contextualizing the plant related data. The term "contextualizing" as used herein is a broad term and is to be given its ordinary and customary meaning to a person of ordinary skill in the art and is not to be limited to a special or customized meaning. The term specifically may refer, without limitation, to the process of adding at least one item of additional information to the data which sets the data into a specific context such as one or more of a context relating to the origin of the data, the purpose of the data, the intended use of the data, the use of the data by other parties or a cross linkage to other data or other information.

Additionally, or alternatively, the processing of the plant related data may comprise providing a time stamp to the plant related data. Thus, the processing of the plant related data at the distribution unit may effect a time scale of the plant related data. For example, the time scale at each industrial plant of the plurality of industrial plants may slightly vary and, thus, the processing may comprise harmonizing the time scale of the plant related data. Additionally, or alternatively, the plant related data is harmonized in such that data from the respective plants is arranged in a proper time sequence with respect to each another. The processing of the plant related data may further comprise providing at least one item of identification information to the plant related data. The item of identification may identify the origin of the plant related data, for example by an item of information identifying the industrial plant, more specifically the sensor of the industrial plant, where the plant related data were recorded. The item of identification may even identify the sub-facility or location which is the origin of the plant related data of the respective plant.

The distribution unit may further be configured for distributing the broadcast data to the plurality of industrial plants. Preferably, the distribution is done simultaneously or essentially simultaneously to each of the plants. Additionally, or alternatively, the processing of the plant related data may comprise masking or filtering the plant related data. Accordingly, the entire plant related data may not be included in the broadcast data. Hence, the broadcast data may comprise a part of the plant related data. For example, data such as signals and/or parameters that are not of interest to any of the plants may be prevented from being distributed through the broadcast data. This way, processing load associated with the filtering and/or configuration can be isolated from the processing layers, e.g., the operational layer. By performing such functions at the at least one distribution unit, scalability of the inter-plant communication can be further improved.

Functions such as filtering or masking may be dependent upon factors such as production situation in the plurality of plants. For example, in batch production, a subsequent batch may require a change in the products and/or value chain. Such changes may reflect in the parts of the plant related data that become relevant or irrelevant as per operating conditions. By handling such changes at the at least distribution unit, the processing layers can be isolated for varying resource demands due to changes in filtering or masking of the respective plant related data. The configuration of the broadcast data can thus be more flexibly and efficiently handled. Additionally, or alternatively, the filtering or masking may be done by any of the plants receiving the broadcast data. For example, if any data such as signals and/or parameters included in the broadcast data are not of interest to the receiving plant, such data may be prevented from being disclosed at that plant. By prevented from being disclosed, it is here meant to prevent being displayed or even prevent from being announced as an audio signal. Thus, the masking or filtering may be done centrally at the distribution unit and/or it may be done at one or more of the plants.

Both masking schemes, namely, masking or filtering done at the distribution unit and the masking or filtering done at the respective plant may be used in tandem to further improve the distribution of relevant plant related data. For example, if a parameter from a first plant is relevant for at least one of the other plants, it may be included in the broadcast data, while at the plants where said parameter is not relevant, it is blocked at the respective plants where it is not relevant.

The distribution unit may comprise at least one of a distribution server and a distribution node.

The distribution node may be a logical unit which is configured, such as by software programming, for enabling interplant information exchange. Specifically, the distribution unit may be at least one computing device, such as at least one computer and/or at least one processor. The distribution node may thus be a piece of software that runs on a single, or multiple servers. Preferably, the distribution node is executed in a distributed fashion for high availability and redundancy.

As outlined above, the broadcast data may be obtained by processing the plant related data.

The broadcast data may specifically comprise a bundle of plant related data comprising plant related data from the plurality of industrial plants, specifically with plant related data from each of the industrial plants. As also outlined above, the broadcast data may comprise either the entire plant related data from each of the industrial plants, or a part of the plant related data from one or more of the industrial plants. Accordingly, the broadcast data may even comprise the entire plant related data from one or more of the plants and respective part of the plant related data of the other one or more respective plants in the plurality of plants. The parts of the plant related data of respective plants may either be identical, i.e., they correspond to similar type of parameters and/or signals, or they may be non-identical, i.e., the parts correspond to different types of signals and/or parameters from the other plants. The broadcast data may further comprise at least one of a timestamp and an item of identification information, such as an item of identification information identifying at least one of the broadcast data, the origin of at least a part of the broadcast data or the like.

As outlined above, each of the plurality of industrial plants may comprise at least one control system. As used herein, without limitation, the term "control system" specifically may refer to an arbitrary system configured, such as by hardware configuration and/or by software programing of at least one processor, for controlling at least one function of the industrial plant. For example, the control system may be configured for controlling and/or monitoring the plurality of sensors of the industrial plant. The control system specifically may comprise at least one processor and/or at least one computer. The control system specifically may comprise at least one user interface allowing for a plant operator of the industrial plant entering commands and/or information into the control system and/or having at least one display device configured for providing one or more of the visual look, audio or haptic information to the operator. Specifically, the at least one control system may be isolated from the other industrial plants. The control system is a part of the control layer.

According to another aspect, the method may further comprise using at least one web server for exchanging web-protocol based messages between the plurality of industrial plants. The term "web server" as used herein is a broad term and is to be given its ordinary and customary meaning to a person of ordinary skill in the art and is not to be limited to a special or customized meaning. The term specifically may refer, without limitation, to at least one device or system which may fully or partially be embodied in software and/or in hardware, specifically in hardware configured for running an appropriate software, which is able to handle and/or satisfy client requests on a suitable protocol based web such as an intranet. The web server specifically may be configured for processing requests over HTTP or other web protocols. The web server specifically may be configured for hosting at least one website. The at least one web server may be connected with each of the plurality of industrial plants. More specifically, the at least one web server may be connected with each of the plurality of industrial plants independently from the network used for the reception of the plant related data and the transmission of the broadcast data, for example, via intranet or Level 4 network. As previously discussed, the operational network is communicatively coupled to the Level 4 layer or intranet. Additionally, or alternatively, the distribution unit may be connected to the web server, specifically directly or indirectly, more specifically indirectly via at least one decision logic. For example, the web-protocol based messages may comprise recommended actions for operators of the industrial plants of the plurality of industrial plants, specifically recommended actions based on real time analysis of the plant related data. The web server may further be configured for providing a chatroom function, such as a chatroom function for exchanging the web-protocol based messages between the plurality of industrial plants. In some cases, the distribution unit may include the decision logic. In some cases, the distribution unit may also include the web server. According to an aspect, the distribution unit may provide the broadcast data to a central decision logic for real-time analysis and feedback into the plant web-based dashboard.

Further, the method may comprise using at least one decision logic, as already mentioned above. The term "decision logic" as used herein is a broad term and is to be given its ordinary and customary meaning to a person of ordinary skill in the art and is not to be limited to a special or customized meaning. The term specifically may refer, without limitation, to at least one device and/or system, which may fully or partially be embodied in software and/or in hardware, which is configured, such as by software programming, for rendering at least one decision as an output on the basis of an input comprising at least one item of information. Thus, as an example, the at least one decision logic may comprise at least one processor as defined above, such as with an appropriate programming by software. The decision may be made on the basis of one or more programmed algorithms and/or other software programs. Thus, as an example, the decision may also be made by using at least one trained algorithm, such as an artificial neural network. The algorithm may be trained on the basis of a plurality of cases having a specific input and rendering at least one specific decision as an output. The at least one decision logic may be configured, such as by hardware configuration and/or by software programming of the decision logic, for retrieving plant related data from the distribution unit. The at least one decision logic may also be configured for generating at least one recommended action based on the plant related data retrieved from the at least one distribution unit. The decision logic may be configured for providing the at least one recommended action to the at least one web server.

Further, the at least one decision logic may comprise at least one backend server. The decision logic, as an example, may be configured, such as by training, for providing optimized settings for at least one of the industrial plants which may be, as an example, used and entered into the respective control system of the industrial plant, such as automatically and/or by the at least one operator of the industrial plant.

The at least one web server and the at least one decision logic may enable especially inexperienced operators to more promptly handle a critical situation. Furthermore, chance of human error may be reduced by providing the at least one recommended action by the decision logic.

Thus, undue outages can be prevented, safe operation of the industrial plant can be ensured, and wastage can be reduced. In critical situations, the response time of the operating personnel may be important in preventing a harmful outcome. The operators who are more experienced may handle such a situation better by more promptly associating one or more parameters with the correct response to that situation. A less experienced operator may not be able to recognize an undesired trend in plant parameters at an early stage and thus may be prevented from acting proactively. The decision logic can be used to recommend actions that the operator of a plant can consider implementing in response to the plant related data, e.g., one or more parameters, from the broadcast data. This can be helpful also for the more experienced operators, who may be reminded of a recommendation that may be better than other responses to a particular situation. Plant safety and/or efficiency can thus be improved.

As outlined above, the method comprises, e.g. in step ii., transmitting the broadcast data to the plurality of industrial plants. Specifically, e.g. step ii., the method may further comprise transmitting the broadcast data also to the at least one industrial plant from which the at least one distribution unit received the plant related data. Thus, the broadcast data may be transmitted to each of the industrial plants of the plurality of industrial plants, whereby each of the industrial plants may receive the same broadcast data. This can be helpful by allowing proper evaluation of relevant plant-related data from each plant in the correct sequence and context. A plant can thus more efficiently and easily follow the events occurring in the rest of the plurality of plants with respect to the events in said plant. The sources of error can hence be at least minimized. The inter-plant communication can thus be made not only prompt, but also more reliable and efficient by preventing sources of human error and incorrect interpretation of events or their sequence. The broadcast data may be transmitted in near real-time to the plurality of industrial plants. Specifically, the near real-time transmission of the broadcast data may comprise a time delay between the reception of plant related data and the transmission of broadcast data of no more than 15 s, specifically of no more than 10 s, more specifically of no more than 5 s. Thus, the reception of the plant related data and the transmission of the broadcast data may comprise a direct cycle-less signal pass-through. Specifically, the reception of the plant related data and the transmission of the broadcast data may comprise direct forwarding of the plant related data or DCS data in a cycle-less callback-based fashion from source, such as from at least one industrial plant, to all targets or recipients, such as to the plurality of industrial plants.

Further, step ii. may be performed repeatedly, specifically continuously repeatedly. Step ii. may, as an example, be performed repeatedly at a constant rate. The constant rate may be different for each of the plant related data. For example, the constant rate may be dependent on the plant related data to be processed and transmitted by the distribution unit. Thus, step ii. may be performed at a first constant rate for a first plant related data and at a second constant rate for a second plant related data, wherein the first constant rate may be different from the second rate.

The constant rate may be dependent on the type of plant related data, such as on a rate of change of the plant related data. Further, step ii. may be performed at least once every 10 s, specifically at least once every 5 s, more specifically at least once every 1 s.

In a further aspect of the present teachings, a distribution unit for interplant communication between a plurality of industrial plants is disclosed. The distribution unit is configured, specifically by using any of the aspects of the method according to the present teachings, such as according to any one of the embodiments disclosed above and/or according to any one of the embodiments disclosed in further detail below, for:
a. receiving the plant related data from the at least one industrial plant of the plurality of industrial plants; and
b. transmitting the broadcast data to the plurality of industrial plants, specifically to each industrial plant of the plurality of industrial plants, wherein the broadcast data comprises at least a part of the plant related data.

The distribution unit is configured for using at least one network for receiving the plant related data and for transmitting the broadcast data. The distribution unit may be configured for performing any of the above-mentioned functions and/or any of the functions mentioned in further detail below by appropriate hardware configuration and/or by software programming of hardware, for example by software programming of a computing device, such as a processor or a computer or the like. Thus, the distribution unit may be configured for performing the method according to the present teachings, such as according to any one of the embodiments disclosed above and/or according to any one of the embodiments disclosed in further detail below.

In a further aspect of the present teachings, a plant communication system for enabling interplant communication between a plurality of industrial plants is disclosed. The plant communication system comprises at least one distribution unit, specifically precisely one distribution unit, according to the present teachings, such as according to any one of the embodiments disclosed above and/or according to any one of the embodiments disclosed in further detail below. The plant communication system further comprises the at least one network for reception of the plant related data and for the transmission of the broadcast data, the network being configured for linking the distribution unit to the industrial plants of the plurality of industrial plants, more specifically in a star-shaped fashion.

The plant communication system may further comprise the plurality of industrial plants linked to the distribution unit via the network, specifically in a star-shaped fashion. For definitions and embodiments of the industrial plant reference is made to definitions and embodiments of the method as disclosed above.

Further, each of the industrial plants may comprise the at least one network interface for connecting the industrial plants with the at least one distribution unit. For definitions and embodiments of the network interface reference is made to definitions and embodiments of the method as disclosed above.

Each of the plurality of industrial plants may comprise the at least one control system. For definitions and embodiments of the control system reference is made to definitions and embodiments of the method as disclosed above.

Similar to the method aspects, each of the plants may comprise a control layer. Thus, as an example, there may also be provided a plant communication system for enabling interplant communication between a plurality of industrial plants wherein each industrial plant comprises a control layer, and wherein the control layer of each of the plants is communicatively coupled to an operational layer, wherein the plant communication system comprises at least one distribution unit, specifically precisely one distribution unit, wherein the at least one distribution unit distribution unit is configured to:
receive plant related data from at least one industrial plant of the plurality of industrial plants; wherein the plant related data is received at the at least one distribution layer via the operational layer; and
transmit broadcast data to the plurality of industrial plants; wherein the broadcast data comprises at least a part of the plant related data, and wherein the broadcast data is received at the plurality of industrial plants via the operational layer.

Viewed from yet another more specific perspective, for example, there can also be provided a plant communication system for enabling interplant communication between a plurality of industrial plants wherein each industrial plant comprises a control layer, and wherein the control layer of each of the plants is communicatively coupled to an operational layer, wherein the plant communication system comprises at least one distribution unit, specifically precisely one distribution unit, wherein the system is configured to:
receive, at the operational layer, plant related data from at least one industrial plant of the plurality of industrial plants; wherein the plant related data comprises data provided by the control layer of each of at the least one industrial plant;
receive, at the at least one distribution unit, the plant related data from the operational layer;
transmit, via the at least one distribution unit, broadcast data to the plurality of industrial plants; wherein the broadcast data comprises at least a part of the plant related data obtained from the operational layer;
receive, at the plurality of industrial plants, the broadcast data.

The at least one control system or the control layer may be configured for exchanging data with the at least one archive, specifically with the at least one PIMS archive, wherein, specifically, the archive may be configured for at least one of storing, collecting and integrating the plant related data. The control system may be configured for communicating with the archive, specifically with the PIMS archive. For example, the communication of the control system with the PIMS archive may comprise a read-only communication. Further, a target of the control system for exchanging data may be the network interface, specifically DCS interfaces, such as OPC DA servers. For definitions and embodiments of the archive, specifically of the PIMS archive, reference is made to definitions and embodiments of the method as disclosed above.

The plant communication system may further comprise the at least one web server for exchanging web-protocol based messages between the plurality of industrial plants. For definitions and embodiments of the web server reference is made to definitions and embodiments of the method as disclosed above.

The distribution unit may be connected to the web server via the at least one decision logic. For definitions and embodiments of the decision logic reference is made to definitions and embodiments of the method as disclosed above.

In a further aspect of the present teachings, a computer program is disclosed. The computer program comprises instructions which, when executed by a computer or computer system, specifically a computer or computer system of a distribution unit and/or of a plant communication system according to the present teachings, such as according to any one of the embodiments disclosed above and/or according to any one of the embodiments disclosed in further detail below, cause the computer or computer system to carry out the method according to the present teachings, such as according to any one of the embodiments disclosed above and/or according to any one of the embodiments disclosed in further detail below.

Thus, specifically, one, more than one or even all of method steps i. to ii. as indicated above may be performed by using a computer or a computer network, preferably by using the computer program.

In a further aspect of the present teachings, a computer program product is disclosed. The computer program product comprises instructions which, when executed by a suitable computer or computer system, specifically a computer or computer system of a distribution unit and/or of a plant communication system according to the present teachings, such as according to any one of the embodiments disclosed above and/or according to any one of the embodiments disclosed in further detail below, cause the computer or computer system to carry out the method according to the present teachings, such as according to any one of the embodiments disclosed above and/or according to any one of the embodiments disclosed in further detail below.

In a further aspect of the present teachings, a computer-readable storage medium is disclosed, the computer-readable storage medium comprising instructions which, when executed by a computer or computer system, specifically a computer or computer system of a distribution unit and/or of a plant communication system according to the present teachings, such as according to any one of the embodiments disclosed above and/or according to any one of the embodiments disclosed in further detail below, cause the computer or computer system to carry out the method according to the present teachings, such as according to any one of the embodiments disclosed above and/or according to any one of the embodiments disclosed in further detail below.

As used herein, the term "computer-readable storage medium" specifically may refer to a nontransitory data storage means, such as a hardware storage medium having stored thereon computer-executable instructions. The computer-readable data carrier or storage medium specifically may be or may comprise a storage medium such as a random-access memory ("RAM") and/or a read-only memory ("ROM").

The computer program may also be embodied as a computer program product. As used herein, a computer program product may refer to the program as a tangible product. The product may generally exist in an arbitrary format, such as in a paper format, or on a computer-readable data carrier and/or on a computer-readable storage medium. Specifically, the computer program product may be distributed over a data network.

As outlined above, the methods and devices according to the present teachings can provide a number of advantages over similar methods and devices known in the art. Specifically, the method and devices according to the present teachings may enable interplant communication between a plurality of industrial plants with minimal to no need for structurally extending the industrial plant's infrastructure. For example, the requirement of installing hard wiring connections in between the industrial plants of the plurality of industrial plants can be obviated. The industrial plants of the plurality of industrial plants may specifically be connected to each other via the at least one distribution unit, which receives the plant related data and transmits the broadcast data via the at least one network. By utilizing via the at least one Level 3 network, synergistic advantages can be obtained by at least utilizing the pre-existing network and reducing multiple sources of human error in novel and non-obvious manner. Additionally, the present teachings can provide a scalable and flexible solution for inter-plant communication with minimal to no affect to the control layer or even device layer of any of the plants. Thus, the method and devices as proposed can allow for fast and efficient interplant communication between the plurality of industrial plants whilst saving costs.

Additionally, the method may be carried out fully automatically by the at least one distribution unit, by the computer program, by the computer program product and/or by the computer-readable storage medium. Thus, the method, when carried out automatically, may reduce the human impact on the interplant communication and, thus, may avoid human errors. Further, the broadcast data may be transmitted in near real-time to each of the plurality of industrial plants. Therefore, the method may improve safe operation of the plurality of industrial plants. For example, an occurrence in one of the industrial plants of the plurality of industrial plants may be accessible to the other industrial plants of the plurality of industrial plants without further time delay, such that a reaction time to adapt to the occurrence may be reduced. Further, by using the method according to the present teachings, the interplant communication may not be dependent on a human operator to transmit the occurrence via a phone call or the like. Thus, the method may allow coordinating the plurality of industrial plants in near-real time. Moreover, plant related information at least by virtue of being transmitted to each plant as the broadcast can ensure that at each plant the sequence of events, derived from in the broadcast data, is correct.

Further, the method according to the present teachings may reduce wastage by enabling potentially each plant to adapt more promptly according to the situation in one or more of the other plants. The plants can thus act more proactively and reliably in controlling their industrial processes, such as production, hence improving efficiency and reducing wastage. For example, if one or more process parameters of a first plant develop in such a way that the production of a first product may be affected, wherein the first product is used by one or more downstream plants in the plurality, the downstream plants can adapt more promptly according the one or more process parameters derived from the broadcast data. The downstream plants can then adapt their processes such that wastage, for example, due to discarding of unfinished products or longer inventory may be prevented. As outlined previously, other advantages such as improvement in plant safety and efficiency can also be obtained.

The at least one distribution unit may be configured, such as by hardware configurations and/or by software programming, for harmonizing and/or contextualizing the plant related data. Thus, harmonizing and/or contextualizing the plant related data may ensure that each industrial plant of the plurality of industrial plants receives the broadcast data comprising a set of signal, specifically the same set of signals with comparable timestamps and identifiers. The distribution unit may further utilize a near-real time broadcasting pattern such that every source value change, for example every change of a process parameter monitored by the at least one sensor of the industrial plant, may be transmitted to each industrial plant of the plurality of industrial plants, specifically by a direct cycle-less signal pass-through. Further, using the at least one network, for example the production network and/or the Level 3 network, for the reception of the plant related data and the transmission of the broadcast data may be a cost-effective way of enabling the interplant communication since there may be no need for establishing additional hard wiring between the plants. Additionally, contextualizing and/or harmonizing the plant related data may reduce human error by improving readability and interpretation of the plant related data.

Further, the at least one web server may be configured for hosting a chatroom application configured for enabling all operators from all industrial plants chatting with each other, via one or more of visual messages such as visual text messages or audio messages. The at least one decision logic may dispatch messages into the chatroom. The plant related data and/or the broadcast data may be displayed together with the chatroom on one dashboard which represents a common view for all operations within the plurality of industrial plants. The decision logic may further compute recommended actions for operators based on real time analysis of the plant related data retrieved from the distribution unit via the network interface of the distribution unit, such as an OPC UA interface.

Summarizing and without excluding further possible embodiments, the following embodiments may be envisaged:

Embodiment 1: A method for interplant communication between a plurality of industrial plants, the method comprising:
  i. providing, at at least one distribution unit, plant related data from at least one industrial plant of the plurality of industrial plants; and
  ii. providing, via the at least one distribution unit, broadcast data to the plurality of industrial plants specifically to each industrial plant of the plurality of industrial plants, wherein the broadcast data comprises at least a part of the plant related data;
  wherein the reception of the plant related data and the transmission of the broadcast data is done via at least one network.

Embodiment 2: The method according to the preceding embodiment, wherein each industrial plant comprises a control layer, the control layer of each of the plants being communicatively coupled to an operational layer, wherein the plant related data is provided at the at least one distribution unit via the operational layer, and wherein the broadcast data is provided to the plurality of industrial plants via the operational layer.

Embodiment 3a: The method according to any of the preceding embodiments, wherein the industrial plants of the plurality of industrial plants are interconnected in the at least one network via the at least one distribution unit.

Embodiment 3b: The method according to any one of the preceding embodiments, wherein the industrial plants of the plurality of industrial plants are connected indirectly in the at least one network via the at least one distribution unit.

Embodiment 4: The method according to the preceding embodiment, wherein at least two of the industrial plants of the plurality of industrial plants are not directly physically connected to each other.

Embodiment 5: The method according to any one of the preceding embodiments, wherein the at least one network comprises at least one of a production network and a Level 3 network.

Embodiment 6: The method according to the preceding embodiment, wherein the Level 3 network is a Level 3 network according to the ANSI/ISA-95 standard.

Embodiment 7: The method according to any one of the preceding embodiments, wherein each industrial plant of the plurality of industrial plants is connected with the at least one distribution unit via at least one network interface.

Embodiment 8: The method according to the preceding embodiment, wherein the network interface comprises at least one OPC standard interface, specifically at least one OPC DA interface.

Embodiment 9: The method according to any one of the preceding embodiments, wherein the at least one distribution unit is configured for processing the plant related data and thereby obtaining the broadcast data.

Embodiment 10: The method according to the preceding embodiment, wherein the distribution unit is configured for processing the plant related data in an on the fly manner.

Embodiment 11: The method according to any one of the two preceding embodiments, wherein the processing of the plant related data comprises harmonizing the plant related data, specifically by harmonizing a nomenclature and/or identifiers of the plant related data.

Embodiment 12: The method according to any one of the three preceding embodiments, wherein the processing of the plant related data comprises contextualizing the plant related data.

Embodiment 13: The method according to any one of the four preceding embodiments, wherein the processing of the plant related data comprises providing a time stamp to the plant related data.

Embodiment 14: The method according to any one of the five preceding embodiments, wherein the processing of the plant related data comprises providing at least one item of identification information to the plant related data.

Embodiment 15: The method according to any one of the preceding embodiments, wherein the distribution unit is configured for distributing the broadcast data to the plurality of industrial plants.

Embodiment 16: The method according to any one of the preceding embodiments, wherein the distribution unit comprises at least one of a distribution server and a distribution node.

Embodiment 17: The method according to any one of the preceding embodiments, wherein the broadcast data comprises a bundle of plant related data comprising plant related data from the plurality of industrial plants, specifically with plant related data from each of the industrial plants.

Embodiment 18: The method according to the preceding embodiment, wherein the broadcast data further comprises at least one of a time stamp and an item of identification information.

Embodiment 19: The method according to any one of the preceding embodiments, wherein each of the plurality of industrial plants comprises at least one control system, specifically at least one control system isolated from the other industrial plants.

Embodiment 20: The method according to the preceding embodiment, wherein the control system comprises at least one of a Level 0, a Level 1 and a Level 2 system.

Embodiment 21: The method according to any one of the two preceding embodiments, wherein the at least one control system is configured for the providing plant related data to the distribution unit, specifically automatically.

Embodiment 22: The method according to any one of the three preceding embodiments, wherein at least one of the control systems is configured for exchanging data with at least one archive, specifically with at least one PIMS archive, wherein, specifically, the archive is configured for at least one of storing, collecting and integrating the data.

Embodiment 23: The method according to the preceding embodiment, wherein the at least one distribution unit is configured for retrieving data from the archive, wherein, specifically, the distribution unit is configured for bypassing at least one network interface of the control system.

Embodiment 24: The method according to any one of the preceding embodiments, wherein the method further comprises using at least one web server for exchanging web-protocol based messages between the plurality of industrial plants.

Embodiment 25: The method according to the preceding embodiment, wherein the at least one web server is connected with each of the plurality of industrial plants, specifically independently from the network used for the reception of the plant related data and the transmission of the broadcast data.

Embodiment 26: The method according to any one of the two preceding embodiments, wherein, additionally, the distribution unit is connected to the web server, specifically directly or indirectly, specifically indirectly via at least one decision logic.

Embodiment 27: The method according to any one of the three preceding embodiments, wherein the web-protocol based messages comprise recommended actions for operators of the industrial plants of the plurality of industrial plants, specifically recommended actions based on real time analysis of the plant related data.

Embodiment 28: The method according to any one of the preceding embodiments, wherein the method further comprises using at least one decision logic, wherein the at least one decision logic is configured for retrieving plant related data from the distribution unit.

Embodiment 29: The method according to the preceding embodiment, wherein the at least one decision logic is configured for generating at least one recommended action based on the plant related data retrieved from the at least one distribution unit.

Embodiment 30: The method according to the preceding embodiment, wherein the at least one decision logic is configured for providing the at least one recommended action to the at least one web server.

Embodiment 31: The method according to any one of the three preceding embodiments, wherein the at least one decision logic comprises at least one backend server.

Embodiment 32: The method according to any one of the preceding embodiments, wherein step ii. further comprises transmitting the broadcast data also to the at least one industrial plant from which the at least one distribution unit received the plant related data.

Embodiment 33: The method according to any one of the preceding embodiments, wherein the broadcast data is transmitted in near real-time to the plurality of industrial plants.

Embodiment 34: The method according to the preceding embodiment, wherein the near real-time transmission of the broadcast data comprises a time delay between the reception of plant related data and the transmission of broadcast data of no more than 15 s, specifically of no more than 10 s, more specifically of no more than 5 s.

Embodiment 35: The method according to any one of the preceding embodiments, wherein step ii. is performed repeatedly, specifically continuously repeatedly.

Embodiment 36: The method according to the preceding embodiment, wherein step ii. is performed repeatedly at a constant rate.

Embodiment 37: The method according to the preceding embodiment, wherein step ii. is performed at least once every 10 s, specifically at least once every 5 s, more specifically at least once every 1 s.

Embodiment 38: A distribution unit for interplant communication between a plurality of industrial plants, wherein the distribution unit is configured for:
  a. receiving plant related data from at least one industrial plant of the plurality of industrial plants; and
  b. transmitting broadcast data to the plurality of industrial plants, specifically to each industrial plant of the plurality of industrial plants, wherein the broadcast data comprises at least a part of the plant related data;
  wherein the distribution unit is configured for using at least one network for receiving the plant related data and for transmitting the broadcast data.

Embodiment 39: The distribution unit according to the preceding embodiment, wherein the distribution unit is configured for performing the method according to any one of the preceding embodiments referring to a method.

Embodiment 40: A plant communication system for enabling interplant communication between a plurality of industrial plants, wherein the communication system comprises at least one distribution unit according to any one of the preceding embodiments referring to a distribution unit, the plant communication system further comprising the at least one network for reception of the plant related data and for the transmission of the broadcast data, the network being configured for linking the distribution unit to the industrial plants of the plurality of industrial plants, more specifically in a star-shaped fashion.

Embodiment 41: The plant communication system according to the preceding embodiment, further comprising the plurality of industrial plants linked to the distribution unit via the network, specifically in a star-shaped fashion.

Embodiment 42: The plant communication system according to any one of the two preceding embodiments, each of the industrial plants comprising at least one network interface for connecting the industrial plants with the at least one distribution unit.

Embodiment 43: The plant communication system according any one of the preceding embodiments referring to a plant communication system, wherein each of the plurality of industrial plants comprises at least one control system.

Embodiment 44: The plant communication system according to the preceding embodiment, wherein at least one of the control systems is configured for exchanging, specifically bidirectionally exchanging, data with at least one archive, specifically with at least one PIMS archive, wherein, specifically, the archive is configured for at least one of storing, collecting and integrating the data.

Embodiment 45: The plant communication system according to any one of the preceding embodiments referring to a plant communication system, further comprising at least one web server for exchanging web-protocol based messages between the plurality of industrial plants.

Embodiment 46: The plant communication system according to the preceding embodiment, wherein the distribution unit is connected to the web server via at least one decision logic.

Embodiment 47: A computer program comprising instructions which, when executed by a computer or computer system, specifically a computer or computer system of a distribution unit and/or of a plant communication system, cause the computer or computer system to carry out the method according to any one of the preceding embodiments referring to a method.

Embodiment 48: A computer program product comprising instructions which, when executed by a computer or computer system, specifically a computer or computer system of a distribution unit and/or of a plant communication system, cause the computer or computer system to carry out the method according to any one of the preceding embodiments referring to a method.

Embodiment 49: A computer-readable storage medium comprising instructions which, when executed by a computer or computer system, specifically a computer or computer system of a distribution unit and/or of a plant communication system, cause the computer or computer system to carry out the method according to any one of the preceding embodiments referring to a method.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the present teachings is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
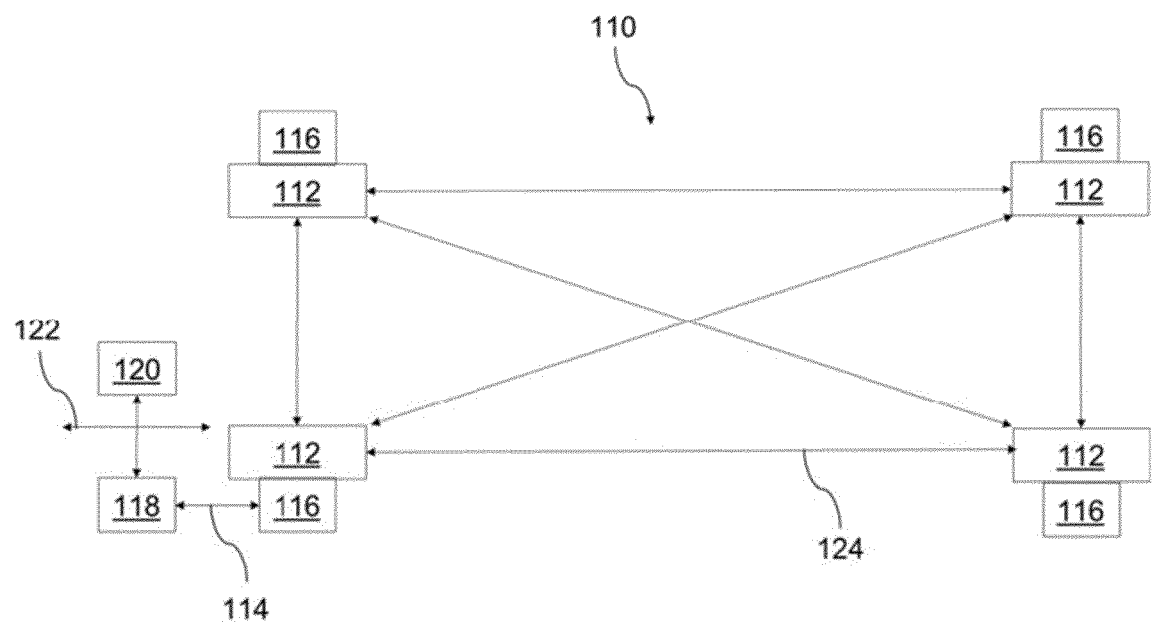
FIG. 1 shows a fictitious conventional communication system.

Industrial production typically starts with upstream products, which are used to derive further downstream products. To date the value chain production via various intermediate products to an end-product is highly restrictive and based on siloed infrastructure. This can hamper introduction of new technologies such as IoT, cloud computing and big data analytics.

Unlike some manufacturing industries, process industry, such as chemical or biochemical industry can subject to very high standards in particular with regard to availability and security. For this reason, computing infrastructures are typically unidirectional and siloed with highly restrictive access to monitoring and control systems of chemical plants.

In general, industrial plants such as chemical plants are embedded in an enterprise architecture in a siloed way with different levels to make a functional separation between operational technology and information technology solutions.

Level 0 relates to the physical processes and defines the actual physical processes in the plant. Level 1, or device layer, relates to intelligent devices for sensing and manipulating the physical processes, e.g. via process sensors, analyzers, actuators and related instrumentation. Level 2, or control layer, relates to control systems for supervising, monitoring and controlling the physical processes. Real-time controls and software; DCS, human-machine interface ("HMI"); supervisory and data acquisition ("SCADA") software are typical components. Level 3, or operational layer, relates to manufacturing operations systems for managing production workflow to produce the desired products. Batch management; manufacturing execution/operations management systems ("MES"/"MOMS"); laboratory, maintenance and plant performance management systems, data historians and related middleware are typical components. Time frames for controlling and monitoring may be shifts, hours, minutes, seconds. There may even be a Level 4 layer, which may relate to business logistics systems for managing the business-related activities of the manufacturing operation. Typically, enterprise resource planning ("ERP") system is the primary system and establishes the basic plant production schedule, material use, shipping and inventory levels. Time frame may be months, weeks, days, shifts.

Additionally, such structures may adhere to strict one-way communication protocols allowing for no data flow into level 2 or below. Not covered in such architectures is the company or enterprise-external internet. The model remains, however, an essential concept within the realm of Cyber Security. Within this context, the challenge is to leverage the benefits of Cloud computing and Big Data, while still guaranteeing the established advantages of existing architectures: i.e. the high availability and reliability of the lower levels system (Level 1 and Level 2), that control the chemical plant, as well as the cyber security.

The technical teachings presented here allows for enhancing monitoring and/or control changing this framework in a systematic way, to introduce new capabilities that are compatible with existing architectures. The present disclosure specifically relates to a highly scalable, flexible and available computing infrastructure for process industry, which at the same time adheres to the high security standards.

In FIG. 1, a fictitious conventional communication system 110 for enabling communication between industrial plants 112 is shown in a schematic view. The conventional communication system 110 may comprise a plurality of industrial plants 112. Each of the industrial plants 112 may have a production network 114 which connects an interface 116 to a PIMS archive 118. Specifically, the production network 114 may be separated from the production network 114 of the other industrial plants 112 and from the intranet 120 of the industrial plant 112 by one or more firewalls 122. In the conventional communication system 110, the communication between the plurality of industrial plants 112 may be performed using phone calls 124, as indicated in FIG. 1 by the arrows in between the industrial plants 112.

Figure 2:
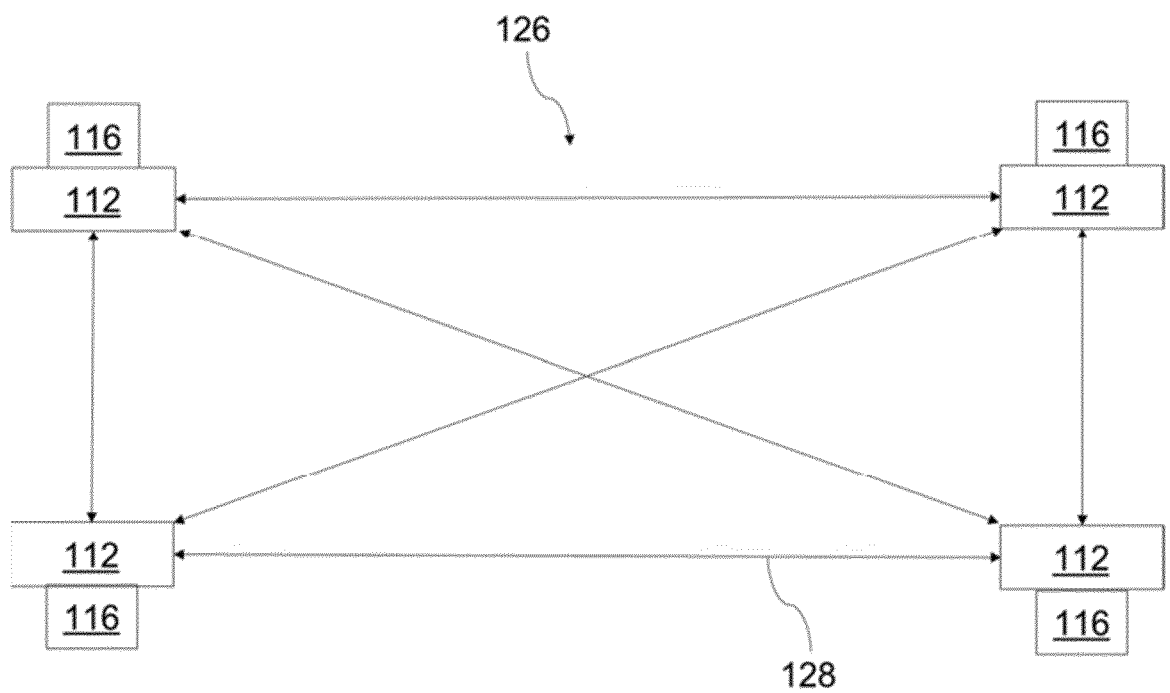
FIG. 2 shows an example of a fully interconnected communication system.

In FIG. 2, a fully interconnected communication system 126 for enabling communication between industrial plants 112 is shown in a schematic view. The fully interconnected communication system 126 may comprise, similar to the conventional communication system 110, a plurality of industrial plants 112. In contrast to the conventional communication system 110, the fully interconnected communication system 126 may connect the industrial plants 112 directly via hard wiring 128, for example via optical fibers and/or electrical cables. Specifically, the fully interconnected communication system 126 may directly connect the interfaces of the industrial plants 112 via hard wiring 128. Thus, the fully interconnected communication system 126 may interconnect the industrial plants 112 directly on the level of a distributed communication system ("DCS"). However, this setup of the fully interconnected communication system 126 may generally be associated with high cost and a need for establishing hard wiring 128 in between the industrial plants 112.

Figure 3:
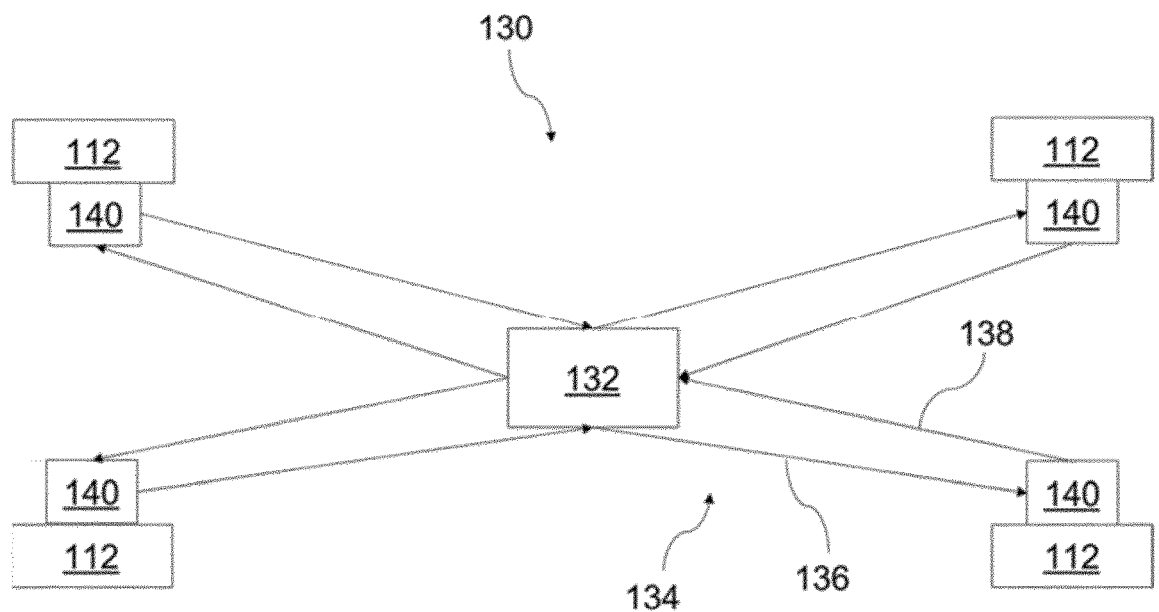
FIG. 3 shows an example of a plant communication system according to the present teachings, for enabling interplant communication between a plurality of industrial plants.

In FIG. 3, an example of a plant communication system 130 according to the present teachings, for enabling interplant communication between a plurality of industrial plants 112, is shown in a schematic view. The plant communication system 130 comprises at least one distribution unit 132. Further, the plant communication system 130 comprises at least one network 134 for providing, i.e., reception 136 of plant related data and for transmission 138 of, broadcast data.

The network 134 is configured for coupling or linking the at least one distribution unit 132 to the industrial plants 112 of the plurality of industrial plants 112, for example as can be seen in FIG. 3, in a star-shaped fashion. The reception 136 of plant related data is indicated in FIG. 3 by an arrow pointing from the industrial plant 112 towards the distribution unit 132. Similar, the transmission 138 of broadcast data is indicated in FIG. 3 by an arrow pointing from the distribution unit 132 towards the industrial plant 112.

The distribution unit 132 is configured for interplant communication between the plurality of industrial plants 112. Specifically, the distribution unit 132 is configured for:
 a. receiving plant related data from the at least one industrial plant 112 of the plurality of industrial plants 112; and
 b. transmitting broadcast data to the plurality of industrial plants 112, specifically to each industrial plant 112 of the plurality of industrial plants 112, wherein the broadcast data comprises at least a part of the plant related data;

Further, the distribution unit 132 is configured for using the at least one network 134 for receiving the plant related data and for transmitting the broadcast data. The distribution unit 132 may be configured, such as by hardware configurations and/or by software programming of the hardware, for performing a method for interplant communication between a plurality of industrial plants 112, which is shown as an example in FIG. 5 and will be explained in further detail below. The distribution unit 132 may comprise at least one of a distribution server or a distribution node in the at least one network 134.

Each of the industrial plants 112 of the plurality of industrial plants 112 may comprise at least one network interface 140 for connecting the industrial plants 112 with the at least one distribution unit 132. The network interface 140 may be or may comprise at least one OPC standard interface 116, such as an OPC DA interface. Further, each of the industrial plants 112 may comprise at least one control system, wherein the control system may be configured, such as by hardware configuration or by software programming, for exchanging data with at least one archive, specifically with at least one PIMS archive 118. The archive may be configured for storing, collecting and integrating the data, specifically the plant related data. The control system and the archive are not shown in FIG. 3.

Figure 4:
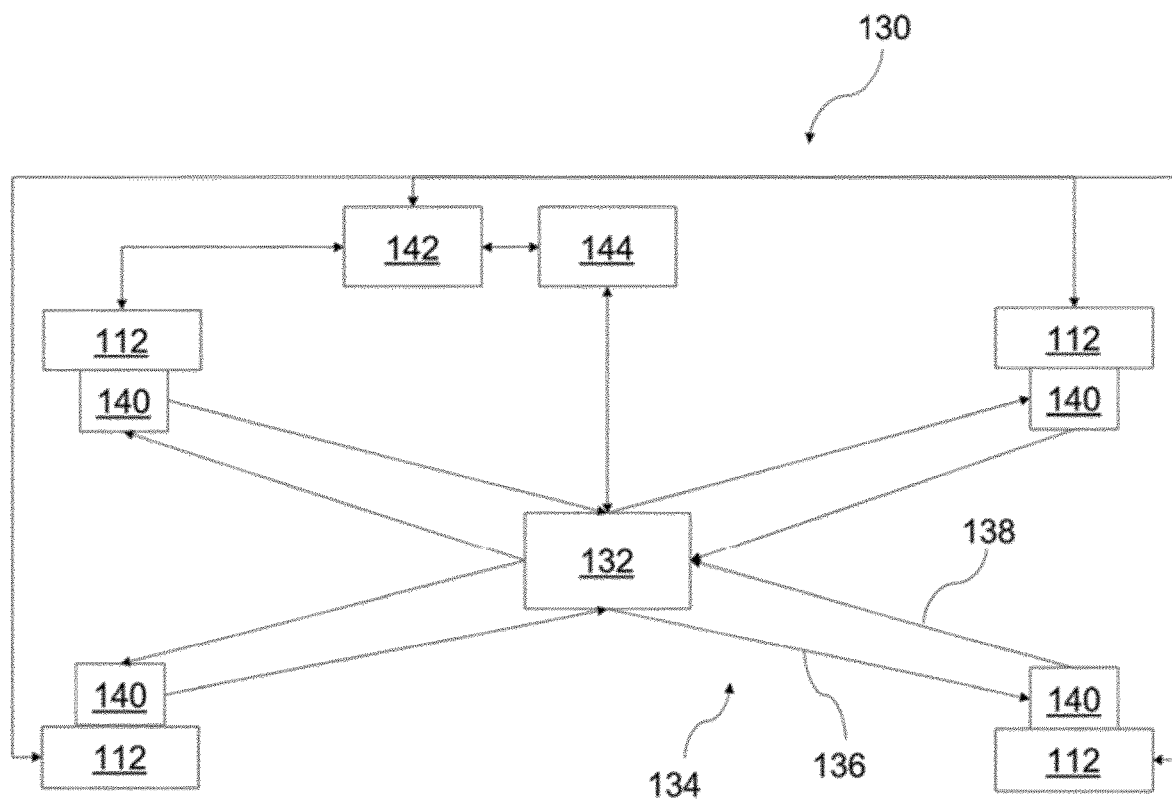
FIG. 4 shows another example of a plant communication system according to the present teachings, for enabling interplant communication between a plurality of industrial plants.

In FIG. 4, another exemplary embodiment according to the present teachings of a plant communication system 130 for enabling interplant communication between a plurality of industrial plants 112 is shown in a schematic view. The plant communication system 130 shown in FIG. 4 may widely correspond to the plant communication system 130 shown in FIG. 3. Thus, reference may be made to the description of FIG. 3.

The plant communication system 130 in FIG. 4, however, may further comprise at least one web server 142 for exchanging web-protocol based messages between the plurality of industrial plants 112. Thus, the web server 142 may be connected to each of the industrial plants 112, specifically by means of physically hard wiring, optical and/or wireless radio-frequency methods.

Further, the web server 142 may be configured for providing at least one chatroom function, such as a chatroom function for exchanging web-protocol based messages between the plurality of industrial plants 112.

The web server 142 may further, directly and/or indirectly, be connected to the distribution unit 132. Thus, the plant communication system 130 may further comprise at least one decision logic 144. The decision logic 144 may be connected, for example by means of physically hard wiring, optical and/or wireless radio-frequency methods, to the distribution unit 132. Thus, the decision logic 144 may be configured, such as by hardware configuration or by software programing, for retrieving plant related data and/or broadcast data from the distribution unit 132.

The decision logic 144 may be or may comprise at least one backend server. Additionally or alternatively, the decision logic 144 may further comprise an interface, such as an OPC standard interface 116, more specifically an OPC UA interface, wherein the plant related data and/or the broadcast data may be retrieved via the interface of the decision logic 144 from the distribution unit 132.

Further, the distribution unit 132 may be connected to the web server 142 via the at least one decision logic 144. The decision logic 144 may further be configured for generating at least one recommended action based on the plant related data or the broadcast data retrieved from the distribution unit 132. The at least one recommended action, the plant related data and/or the broadcast data may be provided by the decision logic 144 to the web server 142, wherein the web server 142 may provide the at least one recommended action to the chatroom function, for example via a dashboard or the like.

Figure 5:
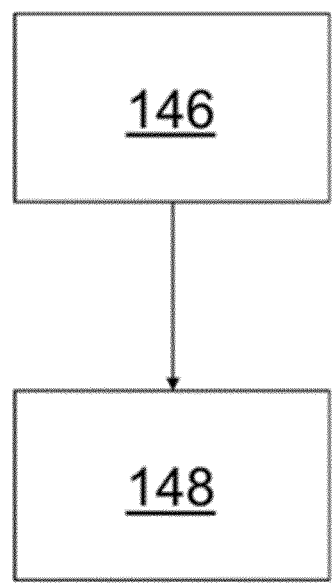
FIG. 5 shows a flow chart of an example of a method according to the present teachings, for interplant communication between a plurality of industrial plants.

In FIG. 5, a flow chart of an aspect of a method for interplant communication between a plurality of industrial plants 112 is shown. Further, the method comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method may comprise additional method steps that are not listed.

The method comprises:
i. (denoted by reference number 146) providing or receiving, at the at least one distribution unit 132, plant related data from the at least one industrial plant 112 of the plurality of industrial plants 112; and
ii. (denoted by reference number 148) providing or transmitting, via the at least one distribution unit 132, broadcast data to the plurality of industrial plants 112 specifically to each industrial plant 112 of the plurality of industrial plants 112, wherein the broadcast data comprises the plant related data;
wherein the reception 136 of the plant related data and the transmission 138 of the broadcast data is done via the at least one network 134.

The method, specifically one or both of steps i. and ii., may be performed repeatedly, more specifically continuously repeatedly. Thus, one or more of the method steps, specifically step ii. may be performed repeatedly at a constant rate. The constant rate may vary and may be dependent on the plant related data to be received and on the broadcast data to be transmitted.

Further, the method, specifically one or both of steps i. and ii., may be performed at least once every 10 s, specifically at least once every 5 s, more specifically at least once every 1 s. Thus, the method may provide means for transmitting current broadcast data to the plurality of industrial plants 112, such that the interplant communication between the plurality of industrial plants 112 may allow for interplant coordination in near real time.

Figure 6:
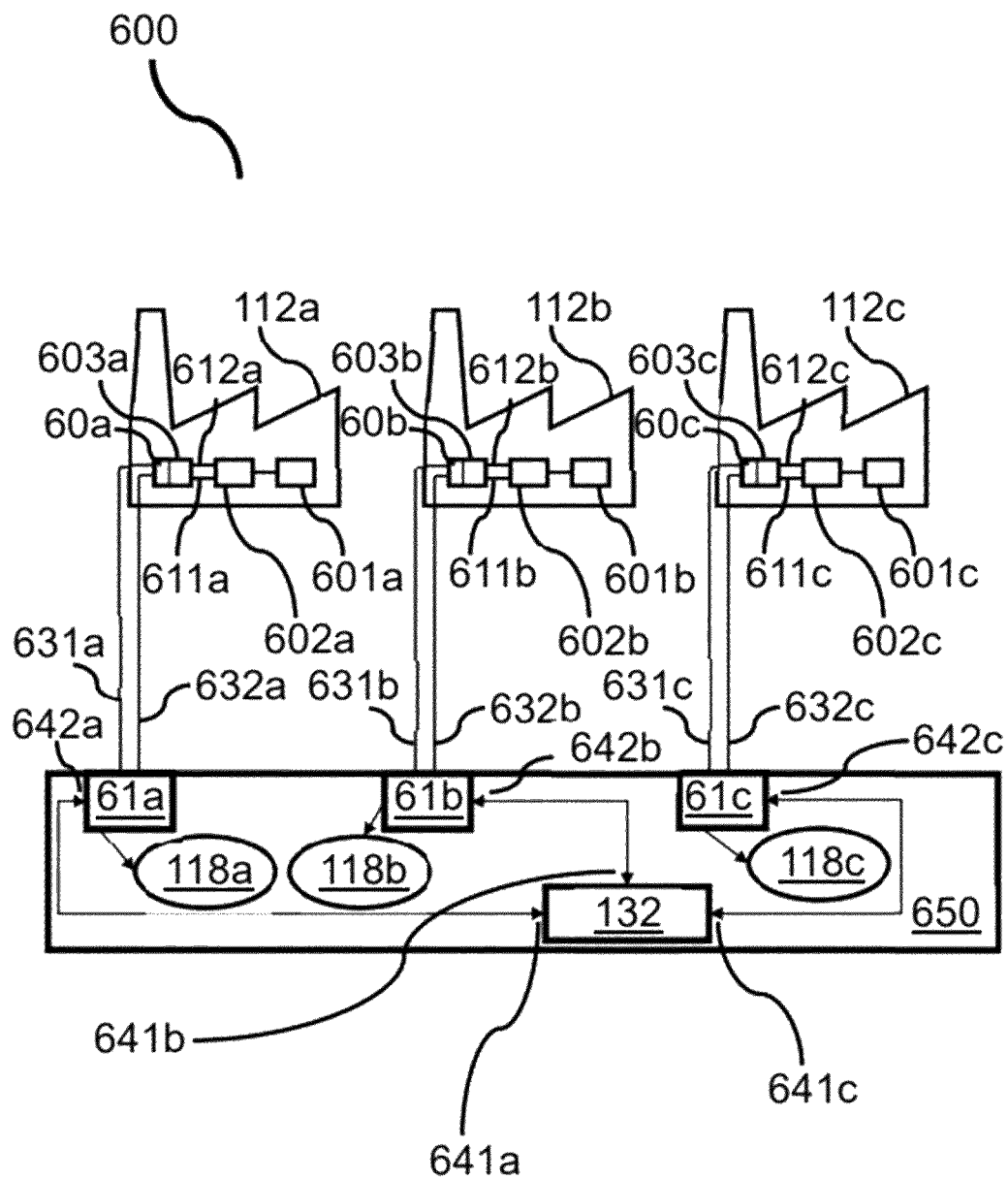
FIG. 6 shows an example block diagram for the plant communication system

FIG. 6 illustrates a block diagram 600 representation showing certain aspects of a plant communication system for enabling interplant communication between a plurality of industrial plants 112. More specifically, a plurality 112 as a non-limiting example comprising three plants 112a, 112b and 112c are shown. As it will be understood to those skilled in the art, the shown representation 600 is a mixed representation, i.e., a combination of a physical representation and a logical representation for ease of discussion. Some components of the drawing may thus not be physically separated or distant as they may appear from the drawing. Similarly, some components of the representation 600 are shown as physical elements although they are logical in nature, for example, data, e.g., 611. Such a representation is done for the ease of understanding for showing interaction between the components using a visual aid.

Each plant, 112a or 112b or 112c comprises a Level 0, 601a, 601b or 603c respectively. For example, a first plant 112a has an individual Level 0 601a that relates to the physical processes in the first plant 112a. Similarly, a second plant 112b and a third plant 112c have their own Level 0 layers 601b and 601c respectively that define the actual physical processes in the respective plant. Each of the plants 112 also comprise individual device layers 602, or Level 1. For example, first plant 112a has an individual Level 1, or first device layer 602a, that relates to devices for sensing and manipulating the physical processes 601a, e.g. via process sensors, analyzers, actuators and related instrumentation. Similarly, the second plant 112b and the third plant 112c have their own Level 1 layers 602b and 602c respectively. Each of the plants 112 also comprise individual control layers 602, or Level 2. For example, the first plant 112a has an individual Level 2, or first control layer 603a, that relates to one or more control systems for supervising, monitoring and controlling the physical processes. A control layer, any of 603a-603c, may comprise for example, real-time controls and software; DCS, HMI and SCADA. Similarly, the second plant 112b and the third plant 112c have their own Level 2 layers 602b and 602c respectively. The control layers 602a-602c may the identical layers or they may be non-identical from each another.

Level 3, or operational layer 650, relates, for example, to manufacturing operations systems for managing production workflow to produce the desired products. The operational layer 650 may be common for the plurality of plants 112. Each of the control layers 603a-603c is communicatively coupled to an operational layer 650. Each of the control layers 603a-603c comprise a network interface 60a, 60b and 60c respectively, which interfaces with the operational layer 650 via interfaces 61a, 61b and 61c respectively. The network interface of a plant, e.g., 60a and the operational layer interface, e.g., 61a, for that plant may be the same component, for example a network card, or they may be in the form of two individual network cards. These, e.g., 60a and 61a, may be termed as at least one network interface 140. The at least one network interface may be physically located in the respective plant, either as the same component or as different components such as one or more network cards at a server in the control layer, e.g., 603a. A network interface in the present teachings refers to a physical and/or logical device that enables a computer system to access a network. The interfaces 61a-61c at the operational layer 650 may be called DCS interfaces, which may be one or more servers communicatively connected to the control layers 603a-603c, e.g., via respective network interfaces 60a-60c. The layer or the server to which a physical network interface is connected may be executing a computer program hosting a logical OPC DA interface. For example, the at least one network interface 140 may be hosting an OPC DA interface which exposes data stemming from the control layer of any respective plant. The operational layer 650 receives supervisory data 631 from each of the control layers 603. For example, the operational layer 650 receives first supervisory data 631a from the first control layer 603a of the first plant 112a. Similarly, second supervisory data 631b and third supervisory data 631c may be received, at the operational layer 650, from the second control layer 603b and the third control layer 603c respectively. The operational layer 650 transmits production data 632 to respective of the control layers 603. For example, the operational layer 650 transmits first production data 632a to the first control layer 603a of the first plant 112a. Similarly, second production data 632b and third production data 632c may be transmitted, by the operational layer 650, to the second control layer 603b and the third control layer 603c respectively.

Furthermore, each of the control layers 603 may be communicatively coupled to the respective of the device layers 602 of their respective plants 112. For each plant, the control layer transmits control data to the device layer, and the control layer receives generated data from the device layer. For example, for the first plant 112a, the first control layer 603a transmits first control data 611a to the first device layer 602*a*, and the first control layer 603*a* receives generated data 612*a* from the first device layer 602*a*. Similarly, for the second plant 112*b* and the third plant 112*c*, the second control layer 603*b* and the third control layer 603*c* may transmit second control data 611*b* and third control data 611*c* respectively to the second device layer 602*b* and the third device layer 602*c*. The second control layer 603*b* and the third control layer 603*c* may receive second generated data 612*b* and third generated data 612*c* respectively from the second device layer 602*b* and the third device layer 602*c*. As can be seen, the control layers 603 are specific to their respective of the plants 112 and are otherwise isolated from each another. The parameters from one plant may thus not be available in another plant.

The operational layer 650 comprises archives 118, for example PIMS. In this specific example, one archive is shown associated with each plant. For example, a first PIMS archive 118*a* is associated with the first plant 112*a*, a second PIMS archive 118*b* is associated with the second plant 112*b*, and a third PIMS archive 118*c* is associated with the third plant 112*c*. It is also possible that any of the plants do not have a PIMS archive. An archive may be understood as a memory storage unit into which data such as process data of the respective of the plants 112 or of at least a part thereof may be stored for archive purposes. For example, the archive 118*a* receives data from the first plants 112*a* via the interface 61*a* at the operational layer 650. Such communication is usually unidirectional. The archives 118 are isolated from each another.

At least one distribution unit 132 is shown, which is shown provided at the operational layer 650. The distribution unit 132 is configured to receive plant related data 641 from the plurality of plants 112. For example, the first plant 112*a* provides first plant related data 641*a* to the distribution unit 132, the first plant related 641*a* data being the plant related data from the first plant 112*a*. Similarly, the second plant 112*b* and the third plant 112*c* provide second plant related data 641*b* and third plant related data 641*c* respectively to the distribution unit 132. The distribution unit 132 is configured to provide, or transmit, broadcast data 642 to the plurality of plants 112. The broadcast data 642 is provided to each of the plants 112*a*-112*c*. The broadcast data 642 comprises at least a part of the plant related data 641, or at least a part of the real-time plant related data 641. The broadcast data 642 may comprise the whole of the plant related data 641 from any one or more of the plants 112, or the broadcast data 642 may comprise a part of the plant related data 641 from any one or more of the plants 112. The broadcast data 642 may be provided, or received, at each of the plants 112*a*-112*c*, either as a part of the respective production data 632*a*-632*c*, and/or as a separate data stream. Preferably, the broadcast data 642 is the same data provided to each of the plants 112. Accordingly, a first broadcast data 642*a* is the same as a second broadcast data 642*b* and a third broadcast data 642*c*. However, optionally, the broadcast data 642 may be filtered for one or more plants according to one or more criteria at the distribution unit 132. Accordingly, the first broadcast data 642*a* may or may not be the same as a second broadcast data 642*b* and/or the third broadcast data 642*c*. Further, the second broadcast data 642*b* may or may not be the same as a third broadcast data 642*c*.

Accordingly, an inter-plant communication can be enabled between the plants 112. Preexisting Level 3 650 network can be leveraged for obviating at least the need for a separate cabling hardware, hence saving costs. Moreover, at least the critical sections layers such as respective control layers 603 and device layers 602 may be prevented to undergo a hardware modification.

LIST OF REFERENCE NUMBERS

110 fictitious conventional communication system
112 industrial plant
114 production network
116 OPC standard interface
118 PIMS archive
120 Intranet
122 firewall
124 phone calls
126 fully interconnected communication system
128 hard wiring
130 plant communication system
132 distribution unit
134 network
136 reception of plant related data
138 transmission of broadcast data
140 network interface
142 web server
144 decision logic
146 receiving, at the distribution unit plant, related data
148 transmitting, via the distribution unit, broadcast data
112*a* first industrial plant
112*b* second industrial plant
112*c* third industrial plant
601*a* first level 0, or level 0 of the first industrial plant
601*b* second level 0, or level 0 of the second industrial plant
601*c* third level 0, or level 0 of the third industrial plant
602*a* first device layer, or device layer of the first industrial plant
602*b* second device layer, or device layer of the second industrial plant
602*c* third device layer, or device layer of the third industrial plant
603*a* first control layer, or control layer of the first industrial plant
603*b* second control layer, or control layer of the second industrial plant
603*c* third control layer, or control layer of the third industrial plant
650 operational layer
60*a* first network interface
60*b* second network interface
60*c* third network interface
61*a* first network interface at the operational layer
61*b* second network interface at the operational layer
61*c* third network interface at the operational layer
611*a* first control data
611*b* second control data
611*c* third control data
612*a* first generated data
612*b* second generated data
612*c* third generated data
631*a* first supervisory data
631*b* second supervisory data
631*c* third supervisory data
632*a* first production data
632*b* second production data
632*c* third production data
641*a* first plant related data
641*b* second plant related data
641*c* third plant related data
642*a* first broadcast data 642b second broadcast data
643c third broadcast data

The invention claimed is:

1. A method for interplant communication between a plurality of industrial plants, the method comprising:
  i. receiving, via at least one distribution unit, plant related data from at least one industrial plant of the plurality of industrial plants; and
  ii. transmitting, via the at least one distribution unit, broadcast data to the plurality of industrial plants specifically to each industrial plant of the plurality of industrial plants, wherein the broadcast data comprises at least a part of the plant related data;
  wherein the reception of the plant related data and the transmission of the broadcast data are done via at least one network, wherein each industrial plant comprises a control layer, the control layer of each of the plants being communicatively coupled to an operational layer, wherein the plant related data is provided at the at least one distribution unit via the operational layer, wherein the broadcast data is provided to the plurality of industrial plants via the operational layer, and wherein the at least one network is a part of the operational layer, and wherein the plant related data is filtered or masked prior to transmission or filtered or masked by the control layer of each of the industrial plant upon receipt of the plant related data.

2. The method according to claim 1, wherein each industrial plant of the plurality of industrial plants is connected with the at least one distribution unit via at least one network interface, wherein the network interface comprises at least one Open Platform Communications ("OPC") standard interface.

3. The method according to claim 1, wherein the at least one distribution unit is configured for processing the plant related data and thereby obtaining the broadcast data, wherein the processing of the plant related data comprises at least one of harmonizing the plant related data, contextualizing the plant related data, providing a time stamp to the plant related data or providing at least one item of identification information to the plant related data.

4. The method according to claim 1, wherein the broadcast data comprises a bundle of plant related data comprising plant related data from the plurality of industrial plants.

5. The method according to claim 4, wherein the broadcast data further comprises at least one of a time stamp and an item of identification information.

6. The method according to claim 1, wherein each of the plurality of industrial plants comprises at least one control system, wherein the at least one control system is configured for providing plant related data to the distribution unit.

7. The method according to claim 6, wherein at least one of the control systems is configured for exchanging data with at least one archive.

8. The method according to claim 1, wherein the method further comprises using at least one web server for exchanging web-protocol based messages between the plurality of industrial plants, wherein the web-protocol based messages comprise recommended actions for operators of the industrial plants of the plurality of industrial plants.

9. The method according to claim 1, wherein the method further comprises using at least one decision logic, wherein the at least one decision logic is configured for retrieving plant related data from the distribution unit, wherein the at least one decision logic is configured for generating at least one recommended action based on the plant related data retrieved from the at least one distribution unit.

10. The method according to claim 1, wherein the broadcast data is transmitted in near real-time to the plurality of industrial plants, wherein the near real-time transmission of the broadcast data comprises a time delay between the reception of plant related data and the transmission of broadcast data of no more than 15 s.

11. A computer-readable storage medium comprising instructions which, when executed by a computer or computer system, cause the computer or computer system to carry out the method according to claim 1.

12. A distribution unit for interplant communication between a plurality of industrial plants, wherein the distribution unit is configured for:
  i. receiving plant related data from at least one industrial plant of the plurality of industrial plants; and
  ii. transmitting broadcast data to the plurality of industrial plants, specifically to each industrial plant of the plurality of industrial plants, wherein the broadcast data comprises at least a part of the plant related data;
  wherein the distribution unit is configured for using at least one network for receiving the plant related data and for transmitting the broadcast data,
  wherein the plant related data is provided via an operational layer and wherein the at least one network is a part of the operational layer, and
  wherein the plant related data is filtered or masked prior to transmission or is to be filtered or masked by a control layer of each of the industrial plant upon receipt of the plant related data.

13. A plant communication system for enabling interplant communication between a plurality of industrial plants, wherein the communication system comprises at least one distribution unit according to claim 12, the plant communication system further comprising the at least one network for reception of the plant related data and for the transmission of the broadcast data, the network being configured for linking the distribution unit to the industrial plants of the plurality of industrial plants, more specifically in a star-shaped fashion.

14. The plant communication system according to claim 13, further comprising the plurality of industrial plants linked to the distribution unit via the network, each of the industrial plants comprising at least one network interface for connecting the industrial plants with the at least one distribution unit.

15. The plant communication system according to claim 13, wherein each of the plurality of industrial plants comprises at least one control system.

16. The plant communication system according to claim 13, further comprising at least one web server for exchanging web-protocol based messages between the plurality of industrial plants.

* * * * *